(12) United States Patent  
Sharma et al.

(10) Patent No.: US 7,930,204 B1  
(45) Date of Patent: Apr. 19, 2011

(54) METHOD AND SYSTEM FOR NARROWCASTING BASED ON AUTOMATIC ANALYSIS OF CUSTOMER BEHAVIOR IN A RETAIL STORE

(75) Inventors: Rajeev Sharma, State College, PA (US); Satish Mummareddy, State College, PA (US); Jeff Hershey, Norfolk, VA (US); Akhil Kamat, State College, PA (US); Chris Ahlers, Kyiv (UA)

(73) Assignee: VideoMining Corporation, State College, PA (US)

( * ) Notice: Subject to any disclaimer, the term of this patent is extended or adjusted under 35 U.S.C. 154(b) by 941 days.

(21) Appl. No.: 11/880,421

(22) Filed: Jul. 20, 2007

Related U.S. Application Data

(60) Provisional application No. 60/833,031, filed on Jul. 25, 2006.

(51) Int. Cl.  
*G06F 17/60* (2006.01)

(52) U.S. Cl. .......................................................... 705/10
(58) Field of Classification Search ...................... 705/10  
See application file for complete search history.

(56) References Cited

U.S. PATENT DOCUMENTS

| | | | |
|---|---|---|---|
| 5,047,614 A | 9/1991 | Bianco | |
| 5,155,591 A | 10/1992 | Wachob | |
| 5,227,874 A * | 7/1993 | Von Kohorn | 705/10 |
| 5,264,822 A * | 11/1993 | Vogelman et al. | 340/286.01 |
| 5,283,731 A | 2/1994 | Lalonde et al. | |
| 5,287,266 A * | 2/1994 | Malec et al. | 705/323 |
| 5,305,197 A * | 4/1994 | Axler et al. | 705/14.4 |
| 5,309,355 A | 5/1994 | Lockwood | |
| 5,331,544 A | 7/1994 | Lu et al. | |
| 5,459,306 A | 10/1995 | Stein et al. | |
| 5,541,835 A * | 7/1996 | Dextraze et al. | 705/10 |
| 5,630,068 A * | 5/1997 | Vela et al. | 705/323 |
| 5,636,346 A | 6/1997 | Saxe | |
| 5,848,396 A * | 12/1998 | Gerace | 705/10 |
| 5,918,211 A * | 6/1999 | Sloane | 705/16 |
| 5,966,696 A * | 10/1999 | Giraud | 705/14.41 |
| 6,002,393 A | 12/1999 | Hite et al. | |
| 6,032,127 A * | 2/2000 | Schkolnick et al. | 705/23 |
| 6,055,573 A | 4/2000 | Gardenswartz et al. | |
| 6,081,619 A * | 6/2000 | Hashimoto et al. | 382/181 |
| 6,112,181 A * | 8/2000 | Shear et al. | 705/10 |
| 6,112,988 A * | 9/2000 | Powell | 235/383 |
| 6,119,098 A | 9/2000 | Guyot et al. | |

(Continued)

FOREIGN PATENT DOCUMENTS

WO   WO 99/14694   *   3/1999

OTHER PUBLICATIONS

Jerome, Mark, Pickles? Ask Your Cart Newsday, Jul. 19, 1991.*

(Continued)

*Primary Examiner* — Scott L Jarrett

(57) ABSTRACT

The present invention is a method and system for automatically changing the advertisement contents on a means for displaying the contents based on a customer's behavior or a group of customers' behavior in a retail store. The analysis of behavioral pattern is performed automatically and in real-time based on the visual information from the shopping and walkthrough history of a customer or a group of customers, using arrays of sensing devices, such as a plurality of means for capturing images, and a plurality of computer vision technologies on the visual information.

20 Claims, 14 Drawing Sheets

U.S. PATENT DOCUMENTS

| | | | |
|---|---|---|---|
| 6,182,050 B1 | 1/2001 | Ballard | |
| 6,236,975 B1 | 5/2001 | Boe et al. | |
| 6,298,330 B1 | 10/2001 | Gardenswartz et al. | |
| 6,385,592 B1 | 5/2002 | Angles et al. | |
| 6,408,278 B1 | 6/2002 | Carney et al. | |
| 6,484,148 B1 | 11/2002 | Boyd | |
| 6,484,939 B1 * | 11/2002 | Blaeuer | 235/383 |
| 6,567,411 B2 * | 5/2003 | Dahlen | 370/401 |
| 6,582,380 B2 | 6/2003 | Kazlausky et al. | |
| 6,584,401 B2 | 6/2003 | Kirshenbaum et al. | |
| 6,659,344 B2 * | 12/2003 | Otto et al. | 235/381 |
| 6,741,973 B1 | 5/2004 | Dove et al. | |
| 6,826,554 B2 * | 11/2004 | Sone | 1/1 |
| 6,847,969 B1 | 1/2005 | Mathai et al. | |
| 6,904,461 B1 * | 6/2005 | Randhava et al. | 709/224 |
| 6,925,441 B1 | 8/2005 | Jones, III et al. | |
| 6,928,343 B2 * | 8/2005 | Cato | 701/24 |
| 7,003,476 B1 | 2/2006 | Samra et al. | |
| 7,006,982 B2 * | 2/2006 | Sorensen | 705/10 |
| 7,081,818 B2 * | 7/2006 | Eckstein et al. | 340/572.1 |
| 7,216,128 B2 * | 5/2007 | Aoki et al. | 707/748 |
| 7,280,696 B2 * | 10/2007 | Zakrzewski et al. | 382/218 |
| 7,351,975 B2 * | 4/2008 | Brady et al. | 250/342 |
| 7,403,931 B2 * | 7/2008 | Tayebnejad et al. | 706/21 |
| 7,606,728 B2 * | 10/2009 | Sorensen | 705/10 |
| 7,742,950 B2 * | 6/2010 | Wolinsky et al. | 705/26 |
| 7,786,857 B2 * | 8/2010 | Yuba et al. | 340/539.13 |
| 7,797,374 B2 * | 9/2010 | Prince | 709/203 |
| 2001/0028301 A1 * | 10/2001 | Geiger et al. | 340/5.91 |
| 2002/0062245 A1 * | 5/2002 | Niu et al. | 705/14 |
| 2002/0161651 A1 * | 10/2002 | Godsey et al. | 705/22 |
| 2002/0178085 A1 * | 11/2002 | Sorensen | 705/26 |
| 2003/0002712 A1 | 1/2003 | Steenburgh et al. | |
| 2003/0039379 A1 * | 2/2003 | Gutta et al. | 382/116 |
| 2003/0053659 A1 | 3/2003 | Pavlidis et al. | |
| 2003/0058339 A1 | 3/2003 | Trajkovic et al. | |
| 2003/0220830 A1 * | 11/2003 | Myr | 705/10 |
| 2004/0111454 A1 * | 6/2004 | Sorensen | 708/200 |
| 2004/0120581 A1 | 6/2004 | Ozer et al. | |
| 2004/0131254 A1 | 7/2004 | Liang et al. | |
| 2004/0199428 A1 * | 10/2004 | Silverbrook et al. | 705/16 |
| 2005/0039206 A1 * | 2/2005 | Opdycke | 725/35 |
| 2005/0149398 A1 * | 7/2005 | McKay | 705/14 |
| 2005/0251408 A1 * | 11/2005 | Swaminathan et al. | 705/1 |
| 2005/0259653 A1 * | 11/2005 | Reuveni | 370/389 |
| 2006/0010028 A1 * | 1/2006 | Sorensen | 705/10 |
| 2006/0010030 A1 * | 1/2006 | Sorensen | 705/10 |
| 2006/0111977 A1 * | 5/2006 | Hawkins | 705/14 |
| 2006/0215880 A1 * | 9/2006 | Berthilsson et al. | 382/103 |
| 2007/0226082 A1 * | 9/2007 | Leal | 705/27 |
| 2008/0005045 A1 * | 1/2008 | Sorensen et al. | 705/500 |
| 2008/0060003 A1 * | 3/2008 | Nocifera et al. | 725/35 |
| 2008/0243614 A1 * | 10/2008 | Tu et al. | 705/14 |

OTHER PUBLICATIONS

Underhill, Paco, Why We Buy—The Science of Shopping Simon & Schuster, 1999.*
Gaymour, Mark, Hidden Camera Reveals Human Side of P-O-P Story P-O-P Times, 1999, Rertreived from Archive.org Apr. 6, 2005.*
Heller, Walter, Tracking Shoppers Through The Combination Store Progressive Grocer, Jul. 1988, vol. 67, No. 7.*
Farley, John U. et al., A Stochastic Model of Supermarket Traffic Flow Operations Research, Vo. 14, No. 4, Jul./Aug. 1966.*
Robins, Gary, Retailers explore new applications for customer counting technology Stores, vol. 76, No. 9, Sep. 1994.*
WhereNet to Assist Supermarkets and Consumer Goods Manufacturers With Analysis of Customer Buying Habits PR Newswire, Apr. 2, 2002.*
Environsell.com Web Pages Environsell, Inc., 2001, Retrieved from Archive.org Feb. 15, 2008.*
Envirosell.com Web Pages—Our Research Methodologies Environsell, Inc., Jun. 2001, Retrieved from Archive.org Apr. 6, 2005.*
EPOP brochure Retrieved from www.ta.toppan/epop.html Oct. 1, 2002.*
Fastware.com web pages—M-Cast product pages Retrieved from www.fastware.comau/mcast.html May 22, 2002.*
Sorenson, Herb, The Science of Shopping Marketing Research, Fall 2003.*
Garf, Robert et al., Transform Your Stores: Enhance Customer Interactions With Advanced Selling Technologies AMR Research, Jun. 2005.*
Larson, Jeffrey S. et al., An Exploratory Look at Supermarket Shopping Paths Jul. 2004.*
Narrowcasting Supermarket Network Retrieved from www/.transvisiondisplays.com Jan. 23, 2004.*
Prasad, Magendra, M.V. et al., A Multi-Agent System for Meeting Out Influence In An Intelligent Environment American Association for Artificial Intelligence, 1999.*
Marti, Stefan et al., The Adaptive Song Selector or Locator (ASSOL) MIT Media Lab, Dec. 2000.*
McCarthy, Joseph F. et al., MuscFX: An Arbiter of Group Preferences for Computer Supportived Collaborative Workouts CSCW, 1998.*
ShopperTrak.com Web Pages ShopperTrak, 2003, Retreived from Archive.org Jun. 1, 2010.*
Greening, Dan R., Tracking users Web Techniques, vol. 4, No. 7, Jul. 1999.*
I. Haritaoglu and M. Flickner, "Attentive Billboards," 11th International Conference on Image Analysis and Processing, Sep. 26-28, 2001, Palermo, Italy.
W. E. L. Grimson, et al., "Using adaptive tracking to classify and monitor activities in a site," in IEEE Conference on Computer Vision and Pattern Recognition, 1998.
C. Stauffer and W. E. L. Grimson, "Adaptive background mixture models for real-time tracking," in IEEE Conference on Computer Vision and Pattern Recognition, 1999.
N. Friedman and S. Russell, "Image segmentation in video sequences: A probabilistic approach," in Thirteenth Conference on Uncertainty in Artificial Intelligence, 1997.
G. R. Bradski, "Computer Vision Face Tracking for Use in a Perceptual User Interface," Intel Technology Journal, Q2, 1998.
F. Porikli, "Multi-Camera Surveillance: Object-Based Summarization Approach," MERL, 2004.
H. Buxton and S. Gong, "Visual surveillance in a dynamic and uncertain world," Artificial Intelligence, 1995, pp. 431-459.
H. Buxton and S. Gong, "Advanced Visual Surveillance using Bayesian Networks," in International Conference on Computer Vision, 1995, Cambridge, Massachusetts.
H. Buxton, "Learning and understanding dynamic scene activity: a review," Image and Vision Compuing 21, 2003, pp. 125-136.
A. Cohen, et al., "Towards an Architecture for Cognitive Vision using Qualitative Spatio-Temporal Representations and Abduction," Spatial Cognition III, 2003.
J. Fernyhough, et al., "Event Recognition using Qualitative Reasoning on Automatically Generated Spatio-Temporal Models from Visual Input," in IJCAI'97 Workshop on Spatial and Temporal Reasoning, 1997, Nagoya.
J. Fernyhough, et al, "Constructing qualitative event models automatically from video input," Image and Vision Computing 18, 2000, pp. 81-103.
A. Galata, et al., "Modeling Interaction Using Learnt Qualitative Spatio-Temporal Relations and Variable Length Markov Models," in European Conference on Artificial Intelligence, 2002. Lyon.
S. Gong and H. Buxton, "Bayesian Nets for Mapping Contextual Knowledge to Computational Constraints in Motion Segmentation and Tracking," 1993, Guildford, England.
R. Howarth and H. Buxton, "Selective attention in dynamic vision," in Thirteenth International Joint Conference on Artificial Intelligence, 1993, Chambery, France.
Y. Ivanov, et al., "Video Surveillance of Interactions," in CVPR'99 Workshop on Visual Surveillance, 1998, Fort Collins, Colorado.
Y. Ivanov and A Bobick, "Recognition of Visual Activities and Interactions by Stochastic Parsing," IEEE Trans on Pattern Analysis and Machine Intelligence, 2000 22(8), pp. 852-872.

G. Medioni, et al., "Event Detection and Analysis from Video Streams," IEEE Trans on Pattern Analysis and Machine Intelligence, 2001 23(8), pp. 873-889.

D. Moore and I. Essa, "Recognizing Multitasked Activities using Stochastic Context-Free Grammar," in Workshop on Models versus Exemplars in Computer Vision held in conjunction with IEEE CVPR 2001, 2001, Kauai, Hawaii.

N. Rota and M. Thonnat, "Activity Recognition from Video Sequences using Declarative Models," in 14th European Conference on Artificial Intelligence, 2000, Berlin, Germany.

M. Brand and V. Kettnaker, "Discovery and Segmentation of Activities in Video," IEEE Trans on Pattern Analysis and Machine Intelligence, 2000 22(8), pp. 844-851.

* cited by examiner

METHOD AND SYSTEM FOR NARROWCASTING BASED ON AUTOMATIC ANALYSIS OF CUSTOMER BEHAVIOR IN A RETAIL STORE

CROSS-REFERENCE TO RELATED APPLICATIONS

This application claims the benefit of U.S. Provisional Patent Application No. 60/833,031, filed Jul. 25, 2006.

FEDERALLY SPONSORED RESEARCH

Not Applicable

SEQUENCE LISTING OR PROGRAM

Not Applicable

BACKGROUND OF THE INVENTION

1. Field of the Invention

The present invention is a system and method for automatically changing the advertisement display contents in real-time based on a customer's behavior or a group of customers' behavior in a retail store by analyzing the behavioral pattern of the customer or the group of customers, based on visual information from the shopping and walkthrough history of said customer or said group of customers, using arrays of image capturing devices and a plurality of computer vision technologies on the visual information.

2. Background of the Invention

There have been earlier attempts to help customers and sales persons in a shopping process utilizing computer-aided devices, such as U.S. Pat. No. 5,047,614 of Bianco, U.S. Pat. No. 5,283,731 of Lalonde, et al. (hereinafter Lalonde), and U.S. Pat. No. 5,309,355 of Lockwood. Bianco disclosed a portable and remote bar code reading means. Lalonde disclosed a computer-based classified advertisement system. Lockwood disclosed an automated sales system, which enhances a travel agent's marketing ability, especially with regard to computerized airline reservation systems.

There have also been attempts to customize and distribute targeted advertising content to customers based on customer profiles, purchase history, or demographic information from the customer in the prior art.

U.S. Pat. No. 5,155,591 of Wachob and U.S. Pat. No. 5,636,346 of Saxe disclosed methods and systems for delivering targeted advertisements and programming to demographically targeted television audiences. U.S. Pat. No. 6,002,393 of Hite, et al. disclosed a system and method for delivering targeted TV advertisements to customers utilizing controllers.

U.S. Pat. No. 5,459,306 of Stein, et al. (hereinafter Stein) disclosed a method and system for delivering product picks to a prospective individual user, especially with regard to a movie rental and sale business. Stein gathered the user information and the user's usage information, which are correlated with a user code and classified based on the use of at least one product. The product picks (promotions and recommendations) are delivered based on the classified information and the user information. However, Stein is foreign to the automatic method of gathering the user information, especially the user behavior, in real-time in a store.

U.S. Pat. No. 6,119,098 of Guyot, et al. (hereinafter Guyot) disclosed a method and apparatus for targeting and distributing advertisements over a distributed network, such as the Internet, to the subscriber's computer. The targeted advertisements were based on a personal profile provided by the subscriber. Guyot was primarily intended for the subscriber with a computer at home, not at a store or a public retail place, and the targeted advertisement creation relied on the non-automatic response from the customer.

U.S. Pat. No. 6,182,050 of Ballard disclosed a method and apparatus for distributing advertisements online using target criteria screening, which also provided a method for maintaining end user privacy. In the disclosure, the demographic information or a desired affinity ranking was gathered by the end user, who completed a demographic questionnaire and ranked various categories of products and services. Ballard is foreign to the behavior analysis of customers in a retail store.

U.S. Pat. No. 6,055,573 of Gardenswartz, et al. and its continuation U.S. Pat. No. 6,298,330 of Gardenswartz, et al. (hereinafter Gardenswartz) disclosed a method and apparatus for communicating with a computer in a network based on the offline purchase history of a particular customer. Gardenswartz included the delivery of a promotional incentive for a customer to comply with a particular behavioral pattern. In Gardenswartz, the customer supplied the registration server with information about the customer, including demographics of the customer, to generate an online profile. In Gardenswartz, the content of advertisements were selected based on changes in the customers' purchase history behaviors, and Gardenswartz is foreign to the real-time behavioral pattern analysis in a retail store, such as the shopping path analysis of the customers in the retail store.

U.S. Pat. No. 6,385,592 of Angles, et al. (hereinafter Angles) disclosed a method and apparatus for delivering customized advertisements within interactive communication systems. In Angles, the interactive devices include computers connected to online services, interactive kiosks, interactive television systems and the like. In Angles, the advertising provider computer generated a customized advertisement based on the customer's profile, upon receiving the advertising request. In Angles, the customer, who wished to receive customized advertisement, first registered with the advertisement provider by entering the demographic information into the advertisement provider's demographic database. Therefore Angles is foreign to the automatic narrowcasting of the advertisement in a retail space based on customer behavior in real-time, without requiring any cumbersome response from the customer.

U.S. Pat. No. 6,408,278 of Carney, et al. (hereinafter Carney) disclosed a method and apparatus for delivering programming content on a network of electronic out-of-home display devices. In Carney, the network includes a plurality of display devices located in public places, and the delivered programming content is changed according to the demographics of the people. Carney also suggests demographic data gathering devices, such as kiosk and automatic teller machines.

U.S. Pat. No. 6,484,148 of Boyd (hereinafter Boyd) disclosed electronic advertising devices and methods for providing targeted advertisements based on the customer profiles. Boyd included a receiver for receiving identifying signals from individuals such as signals emitted by cellular telephones, and the identifying signal was used for the targeted advertisements to be delivered to the individuals.

U.S. Pat. No. 6,847,969 of Mathai, et al. (hereinafter Mathai) disclosed a method and system for providing personalized advertisements to customers in a public place. In Mathai, the customer inserts a personal system access card into a slot on a terminal, which automatically updates the customer profile based on the customer's usage history. The customer profile is used for targeted advertising in Mathai. However, the usage of a system access card is cumbersome to the customer. The customer has to carry around the card when shopping, and the method and apparatus is not usable if the card is lost or stolen. Clearly, Mathai is foreign to the idea of changing the advertising content in a retail store based on the real-time analysis of the customer's behavior inside the store utilizing non-cumbersome automatic computer vision technology.

Haritaoglu, et al. (hereinafter Haritaoglu) in "Attentive Billboards", 11th International Conference on Image Analysis and Processing, Sep. 26-28, 2001, Palermo, Italy, disclosed a real-time vision system, which detected, tracked, and counted the number of people standing in front of billboards. Especially, Haritaoglu disclosed an infrared illumination based pupil detection to determine whether the people are looking at the billboards.

However, as Haritaoglu disclosed, the short-range requirement for the infrared illumination-based pupil detection technology makes the method impractical in the retail store environment. In Haritaoglu, the people have to be close to the billboard within a 10-foot distance. Since it is not practical to force the customers to stand within a 10-foot distance from the displayed object, the method of using an infrared light source will miss many viewers who are outside the range but within the opportunity to see (OTS) area in the vicinity of the displayed object. In addition, in order to reliably detect the bright eye on-axis illumination from one of the infrared light sources, which is closely located to the camera, the size of the images has to be large, which can also be impractical. If the size of the images has to be relatively large, it is difficult for the camera to cover the multiple viewers in the OTS area, while focusing on a couple of viewers' faces. Furthermore, the additional infrared devices increase the cost per displayed object, and it will be a difficult task to install the devices in a manner non-obtrusive to the customers. Therefore, it is necessary to have a non-obtrusive, cost-efficient, and broad-range means for tracking customers.

In another part of the effort in a retail shopping environment, there have also been attempts for collecting market research data in a retail store.

U.S. Pat. No. 5,331,544 of Lu, et al. (hereinafter Lu) disclosed an automated system for collecting market research data. Especially, Lu disclosed "an automatic face recognition system and method to identify a retail customer," which can measure the shopping frequency at a given store. Lu also disclosed "a shopper's attentiveness to a display or advertisement may be correlated with purchases of products and with other demographic purchase-related variables." However, Lu is foreign to narrowcasting or behavior analysis based on customer movement in a retail store.

U.S. Pat. No. 6,236,975 of Boe, et al. (hereinafter Boe) disclosed a method and system for compiling customer data using an online interaction between a customer and a survey system. Boe's system is intended for targeted marketing, but it is not an, automatic system. The need for an automatic system, which does not require any involvement from the customers, for delivering targeted advertisement content to a display in a retail store based on real-time analysis of the customers' behavior is foreign to Boe.

U.S. Pat. No. 6,925,441 of Jones, III, et al. (hereinafter Jones) disclosed a system and method for targeted marketing, in which the targeted marketing is based on the financial characteristics of the customer, the type of offer being made, and the channel of communication for delivery of the offer. One of the objects in Jones is to have a better description of a customer's spending habits through querying databases. However, Jones is foreign to the idea of producing targeted advertisement based on real-time behavior analysis of customers in a retail store.

U.S. Pat. No. 7,003,476 of Samra, et al. (hereinafter Samra) also disclosed a system and method for targeted marketing using a 'targeting engine', which analyzes data input and generates data output. Samra used historical data to determine a target group based on a plurality of embedded models, where the models are defined as predicted customer profiles based on historical data, and the models are embedded in the 'targeting engine'. In Samra, the 'targeting engine' maintains a customer database based on demographics, but Samra is clearly foreign to the idea of displaying targeted advertisement content in a retail store based on the automatic and real-time behavior analysis of the customer.

With regard to the behavior analysis, an exemplary disclosure can be found in U.S. Pat. No. 6,582,380 of Kazlausky, et al. (hereinafter Kazlausky), which disclosed a system and method for monitoring the activity level of children in a classroom environment. Clearly, Kazlausky is foreign to the concept of analyzing the customers' behavior in real-time, based on visual information of the customers, such as the shopping path tracking and analysis, for the sake of delivering targeted advertisement content to a display in a retail store.

U.S. Pat. No. 6,741,973 of Dove, et al. (hereinafter Dove) disclosed a model of generating customer behavior in a transaction environment. Although Dove disclosed video cameras in a real bank branch as a way to observe the human behavior, Dove is clearly foreign to the concept of automatic and real-time analysis of the customers' behavior, based on visual information of the customers in a retail environment, such as the shopping path tracking and analysis, for the sake of delivering targeted advertisement content to a display in the retail environment.

There have been earlier attempts for understanding customers' shopping behavior captured in a video in a targeted environment, such as in a retail store, using cameras.

U.S. Pat. Appl. Pub. No. 2006/0010028 of Sorensen (hereinafter Sorensen 1) disclosed a method for tracking shopper movements and behavior in a shopping environment using a video. In Sorensen 1, a user indicated a series of screen locations in a display at which the shopper appeared in the video, and the series of screen locations were translated to store map coordinates. The step of receiving the user input via input devices, such as a pointing device or keyboard, makes Sorensen 1 inefficient for handling a large amount of video data in a large shopping environment with a relatively complicated store layout, especially over a long period of time. The manual input by a human operator/user cannot efficiently track all of the shoppers in such cases, not to mention the possible human errors due to tiredness and boredom. Additionally, the manual input approach is not scalable when the number of shopping environments to handle increases.

Although U.S. Pat. Appl. Pub. No. 2002/0178085 of Sorensen (hereinafter Sorensen 2) disclosed a usage of tracking device and store sensors in a plurality of tracking systems primarily based on the wireless technology, such as the RFID, Sorensen 2 is clearly foreign to the concept of applying computer vision-based tracking algorithms to the field of understanding customers' shopping behavior and movement. In Sorensen 2, each transmitter was typically attached to a handheld or push-type cart. Therefore, Sorensen 2 cannot distinguish the behaviors of multiple shoppers using one cart from a single shopper who is also using also one cart. Although Sorensen 2 disclosed that the transmitter may be attached directly to a shopper via a clip or other form of customer surrogate when a customer is shopping without a cart, this will not be practical due to the additionally introduced cumbersome steps to the shopper, not to mention the inefficiency of managing the transmitter for each individual shopper.

With regard to the temporal behavior of customers, U.S. Pat. Appl. Pub. No. 2003/0002712 of Steenburgh, et al. (hereinafter Steenburgh) disclosed a relevant prior art. Steenburgh disclosed a method for measuring dwell time of an object, particularly a customer in a retail store, which enters and exits an environment, by tracking the object and matching the entry signature of the object to the exit signature of the object, in order to find out how long people spend in retail stores.

U.S. Pat. Appl. Pub. No. 2003/0053659 of Pavlidis, et al. (hereinafter Pavlidis) disclosed a method for moving object assessment, including an object path of one or more moving objects in a search area, using a plurality of imaging devices and segmentation by background subtraction. In Pavlidis, the object included customers. Pavlidis was primarily related to monitoring a search area for surveillance, but Pavlidis also included itinerary statistics of customers in a department store.

U.S. Pat. Appl. Pub. No. 2004/0120581 of Ozer, et al. (hereinafter Ozer) disclosed a method for identifying activity of customers for marketing purpose or activity of objects in surveillance area, by comparing the detected objects with the graphs from a database. Ozer tracked the movement of different object parts and combined them to high-level activity semantics, using several Hidden Markov Models (HMMs) and a distance classifier.

U.S. Pat. Appl. Pub. No. 2004/0131254 of Liang, et al. (hereinafter Liang) also disclosed the Hidden Markov Models (HMMs) as a way, along with the rule-based label analysis and the token parsing procedure, to characterize behavior. Liang disclosed a method for monitoring and classifying actions of various objects in a video, using background subtraction for object detection and tracking. Liang is particularly related to animal behavior in a lab for testing drugs.

With regard to path analysis, an exemplary disclosure can be found in U.S. Pat. No. 6,584,401 of Kirshenbaum, et al. (hereinafter Kirshenbaum), which disclosed a method and apparatus for automatically gathering data on paths taken by commuters for the sake of improving the commute experience. Kirshenbaum disclosed a global positioning system, mobile phone, personal digital assistant, telephone, PC, and departure or arrival indications as some ways for gathering the commute data. Clearly, Kirshenbaum is foreign to the concept of analyzing the customers' behavior in real-time, based on visual information of the customers using the means for capturing images, such as the shopping path tracking and analysis, for the sake of delivering targeted advertisement content to a display in a retail store.

U.S. Pat. Appl. Pub. No. 2003/0058339 of Trajkovic, et al. (hereinafter Trajkovic) disclosed a method for detecting an event through repetitive patterns of human behavior. Trajkovic learned multidimensional feature data from the repetitive patterns of human behavior and computed a probability density function (PDF) from the data. Then, a method for the PDF analysis, such as Gaussian or clustering techniques, was used to identify the repetitive patterns of behavior and unusual behavior through the variance of the Gaussian distribution or cluster.

Although Trajkovic can model a repetitive behavior through the PDF analysis, Trajkovic is clearly foreign to the event detection for the aggregate of non-repetitive behaviors, such as the shopper traffic in a physical store. The shopping path of an individual shopper can be repetitive, but each shopping path in a group of aggregated shopping paths of multiple shoppers is not repetitive. Trajkovic did not disclose the challenges in the event detection based on customers' behaviors in a video in a retail environment such as this, and Trajkovic is clearly foreign to the challenges that can be found in a retail environment.

While the above mentioned prior arts try to deliver targeted contents to the customer in a computer network or a standalone system, using customer profiles, a customer's purchase history, or demographic information from customers, they are clearly foreign to the automatic and real-time delivery of targeted contents (narrowcasting) of the advertisement in a retail space based on customer behavior, such as the shopping path in the store, without requiring any cumbersome involvement from the customer.

Although there have been attempts to customize advertising content, using demographic information or a customer profile through cumbersome requests to the customers and responses from them, such as using questionnaires, registration forms, or electronic devices, in the prior art, the targeted advertisement based on automatic customer behavior analysis in a retail store using an efficient computer vision tracking technology has not been introduced in any of the prior art. Furthermore, automatic and real-time customer behavioral pattern analysis in retail stores based on the computer vision technology has been foreign to any of the prior art.

The present invention is a method and system for selectively executing targeted media on a means for displaying output based on the automatic and real-time analysis of the customer behavior, called behavior-based narrowcasting (BBN), in the view of the means for capturing images, providing an efficient and robust solution, which solves the aforementioned problems in the prior art.

Computer vision algorithms have been shown to be an effective means for detecting and tracking people. These algorithms also have been shown to be effective in analyzing the behavior of people in the view of the means for capturing images. This allows for the possibility of connecting the visual information from a scene to the behavior and content of advertising media. The invention allows freedom of installation position between data gathering devices, a set of cameras, and display devices. The invention automatically and unobtrusively analyzes the customer behavior without involving any hassle of feeding information manually by the customer.

Another limitation found in the prior arts is that the data gathering device is often collocated adjacent to the display device in the prior art. However, depending on the public place environment and the business goal, where the embodiment of the system is installed, it may be necessary to install the data gathering devices independent of the position of the display device. For example, some owners of public places could want to utilize the widely used and already installed surveillance cameras in their public places for the data gathering. In this situation, the surveillance cameras may not necessarily be collocated adjacent to the display devices.

The BBN enables the separation of the device locations, which makes the layout of equipment installation flexible. In the above exemplary cases, the BBN enables the targeted content to be delivered and displayed through display devices, which do not need to be collocated adjacent to the data gathering devices, such as cameras. In addition, the targeted message propagation in the BBN looks more coincidental than deliberately arranged when the customer arrives at the advertisement display at the end of the path.

SUMMARY

The present invention is a method and system for automatically changing the advertisement display contents based on a customer's behavior or a group of customers' behavior in a retail store by automatically analyzing the behavioral pattern of the customer or the group of customers in real-time.

The present invention provides solutions to tailor in-store marketing messages based on the behaviors of customers, which are tracked automatically and can trigger content changes in real-time. These solutions enable the display of relevant messages or content to viewers when they are more likely to view such messages or take action based on such messages. This approach allows advertisers, retailers and other stakeholders to more efficiently target customers and generate incremental interest and sales by altering in-store messaging.

The present invention automatically measures the path a customer takes during a visit to a store. Using this data, in-store messaging can be presented based on the areas of the store in which a customer has shopped most recently. Even further, in another embodiment of the present invention, the data can be used to predict and present the in-store messaging based on the areas they are most likely to shop next or some relevant combination of previously shopped areas. This sequencing allows messages to be delivered that can issue a call to action for a product that has already been viewed or reference a product that is likely to be viewed in the near future—thus improving the probability of purchase.

In addition to sequence, direction of travel past a particular display can be used as the basis for adjusting content to match the predicted shopping pattern of a customer. Messaging in a given area of the store can be changed to account for multiple visits to that area by the same customer. This frequency pattern might trigger a series of related, but progressively engaging or informative advertisements, for example, that will steadily build awareness of a given product and increase the probability of purchase.

In-store messages can be tailored based on the length of time a customer spends in a given area. Using this data, content length and message can be matched to the perceived activity of the customer, based on their dwell time in a particular area.

It is an object of the present invention to analyze the customers' behavior automatically without requiring any cumbersome involvement or feedback from the customers.

It is a further object of the present invention to remove the use of any physical devices or media, such as a cellular telephone, personal digital assistant (PDA), automatic teller machine, kiosk, terminal keypad, online feedback, survey form, registration form, questionnaire, bar-coded card, identification card, or access card, for analyzing the customers' behavior in a retail store.

It is another object of the present invention to use the visual information from the shopping and walkthrough history of said customer or said group of customers, using arrays of image capturing devices and a plurality of computer vision technologies on the visual information.

It is a further object of the present invention to generate the customer profiles which are used for matching targeted advertisement in a pre-defined set of advertisement databases purely based on automatic and real-time analysis of the customer's behavior in a retail store.

It is a further object of the present invention to analyze the customers' shopping paths in order to understand the customers' behavior.

In a preferred embodiment, the location of the means for capturing images is not limited by the location of the means for displaying output for the targeted advertisement.

DRAWINGS

Figures

DETAILED DESCRIPTION OF THE INVENTION

Figure 1:
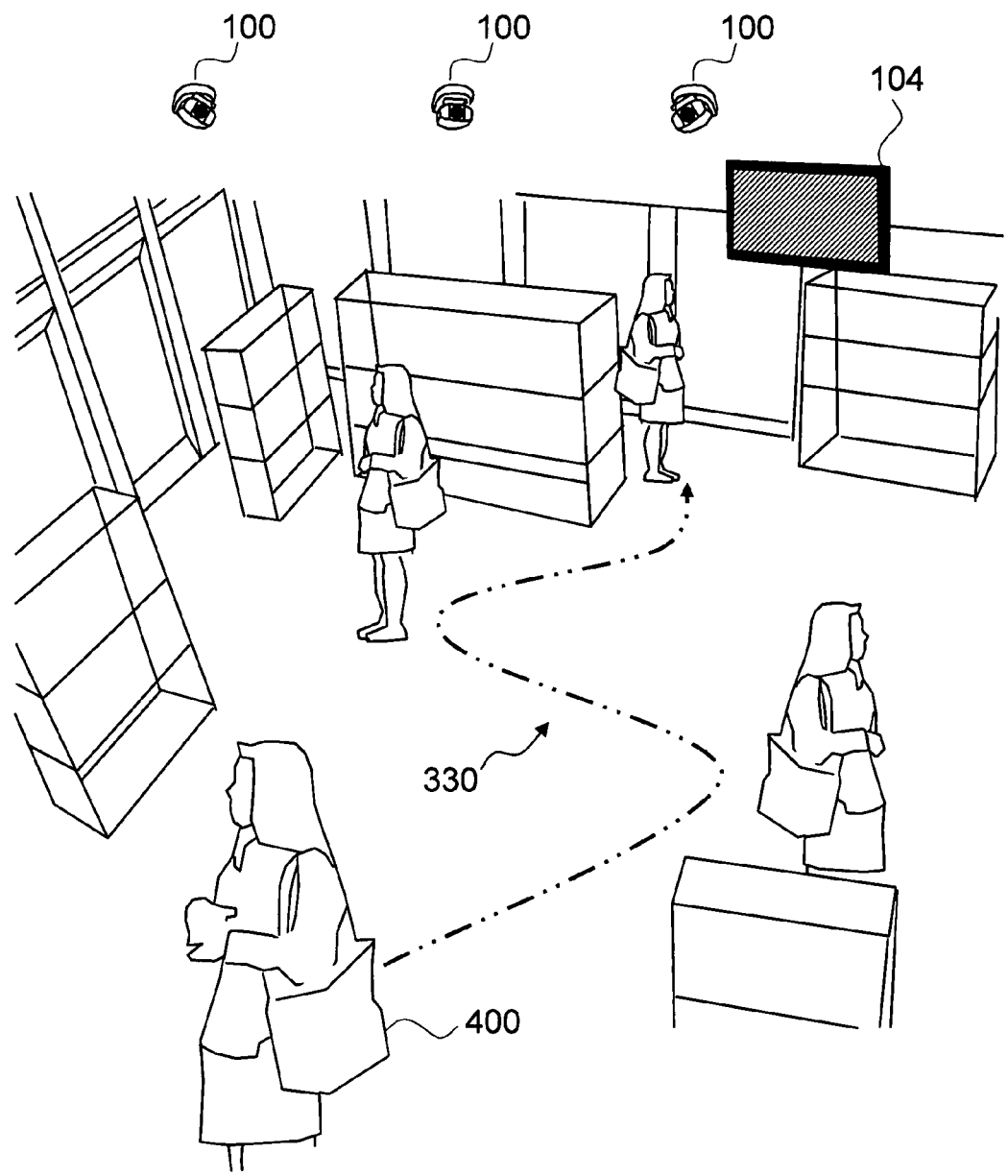
FIG. 1 is an overall view of a preferred embodiment of the invention, where the present invention tracks and analyzes the behavior of a customer through the path the customer took in a retail store and provides a narrowcasting of targeted advertisement based on the analysis of the behavioral pattern of the customer.

FIG. 1 shows an overall view of an exemplary embodiment of the invention. In the exemplary embodiment, the present invention tracks and analyzes the behavior of a customer 400 through the path 330 the customer 400 took in a retail store and automatically narrowcasts the advertisement for targeted advertising based on the analysis of the behavioral pattern of the customer 400. The present invention is called behavior based narrowcasting (BBN). In an exemplary embodiment shown in FIG. 1, the BBN system first captures a plurality of input images of the customer 400 in a store through a plurality of means for capturing images 100. Then, the BBN system processes said plurality of input images in order to analyze the behavior of the customer 400. Based on the information from the analyzed behavior, the BBN customizes the display contents for the targeted advertising in real-time while the customer 400 is in motion in the shopping path 330 in the store. The means for displaying output 104 shows the targeted advertising contents to the customer 400 when the customer 400 approaches the means for displaying output 104.

Overview

The present invention provides solutions to tailor in-store marketing messages based on the behaviors of customers, which are tracked automatically and can trigger content changes in real-time. These solutions enable the display of relevant messages or content to viewers when they are more likely to view such messages or take action based on such messages. This approach allows advertisers, retailers and other stakeholders to more efficiently target customers and generate incremental interest and sales by altering in-store messaging.

Shopping Path Based Measures

Sequence

The present invention automatically measures the shopping path 330 of a customer 400 during a visit to a store. Using this data, in-store messaging can be presented based on the areas of the store in which a customer 400 has shopped most recently, the areas they are most likely to shop next, or some relevant combination of previously shopped areas. This sequencing allows messages to be delivered that can issue a call to action for a product that has already been viewed or reference a product that is likely to be viewed in the near future—thus improving the probability of purchase.

Direction of Travel

In addition to sequence, direction of travel past a particular display can be used as the basis for adjusting content to match the predicted shopping pattern of a customer 400.

Frequency

Messaging in a given area of the store can be changed to account for multiple visits to that area by the same customer 400. This frequency pattern might trigger a series of related, but progressively engaging or informative advertisements, for example, that will steadily build awareness of a given product and increase the probability of purchase.

Time Based Measures

Dwell Time

In-store messages can be tailored based on the length of time a customer 400 spends in a given area. Using this data, content length and message can be matched to the perceived activity of the customer 400, based on their dwell time in a particular area.

Figure 2:
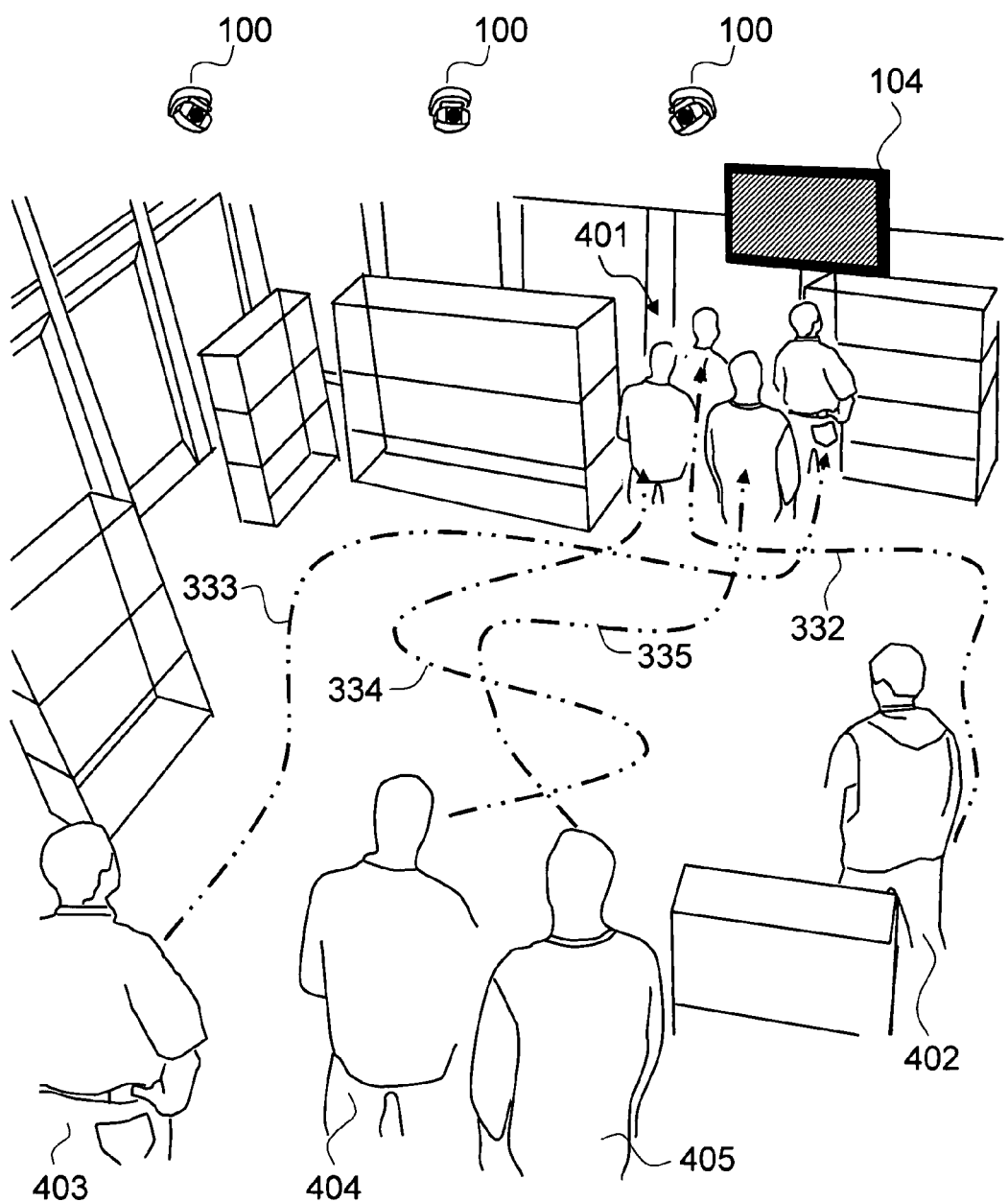
FIG. 2 is an overall view of another preferred embodiment of the invention, where the present invention tracks and analyzes the behavior of a group of customers through the paths the group of customers took in a retail store and provides a narrowcasting of targeted advertisement based on the analysis of the behavioral pattern of the group of customers.

FIG. 2 shows an overall view of another exemplary embodiment of the invention, where the BBN tracks and analyzes the behavior of a group of customers 401 through the paths the group of customers 401 took in a retail store and provides a narrowcasting of targeted advertisement based on the analysis of the behavioral pattern of the group of customers 401. In BBN, the process for analyzing and extracting the behavioral pattern of the interest is performed either at an individual customer 400 level or at a group of customers 401 level.

For example, in the exemplary embodiment shown in FIG. 2, the BBN first captures a plurality of input images of the group of customers 401 and their paths, such as the path A 332, path B 333, path C 334, and path D 335 for the customer A 402, customer B 403, customer C 404, and customer D 405, respectively, based on the individual tracking information in a store through a plurality of means for capturing images 100. Then, the BBN processes said plurality of input images in order to analyze the behavior of the group of customers 401, and customizes the display contents for the targeted advertising according to the information from the analyzed behavior. The means for displaying output 104 shows the targeted advertising contents to the group of customers 401 when the group of customers 401 approaches the means for displaying output 104.

Within the group of customers 401, each customer's behavior analysis can be different. In the exemplary embodiment, the present invention aggregates the plurality of individual behavior analyses, and then the present invention determines the final behavior for the group of customers 401 by analyzing the aggregated behavior analyses of each customer. The decision for the behavior analysis for the group of customers 401 can be made based on a set of pre-defined rules. For example, majority among the aggregated behavior analyses can be used as the representative behavior analysis for the group of customers 401.

Figure 3:
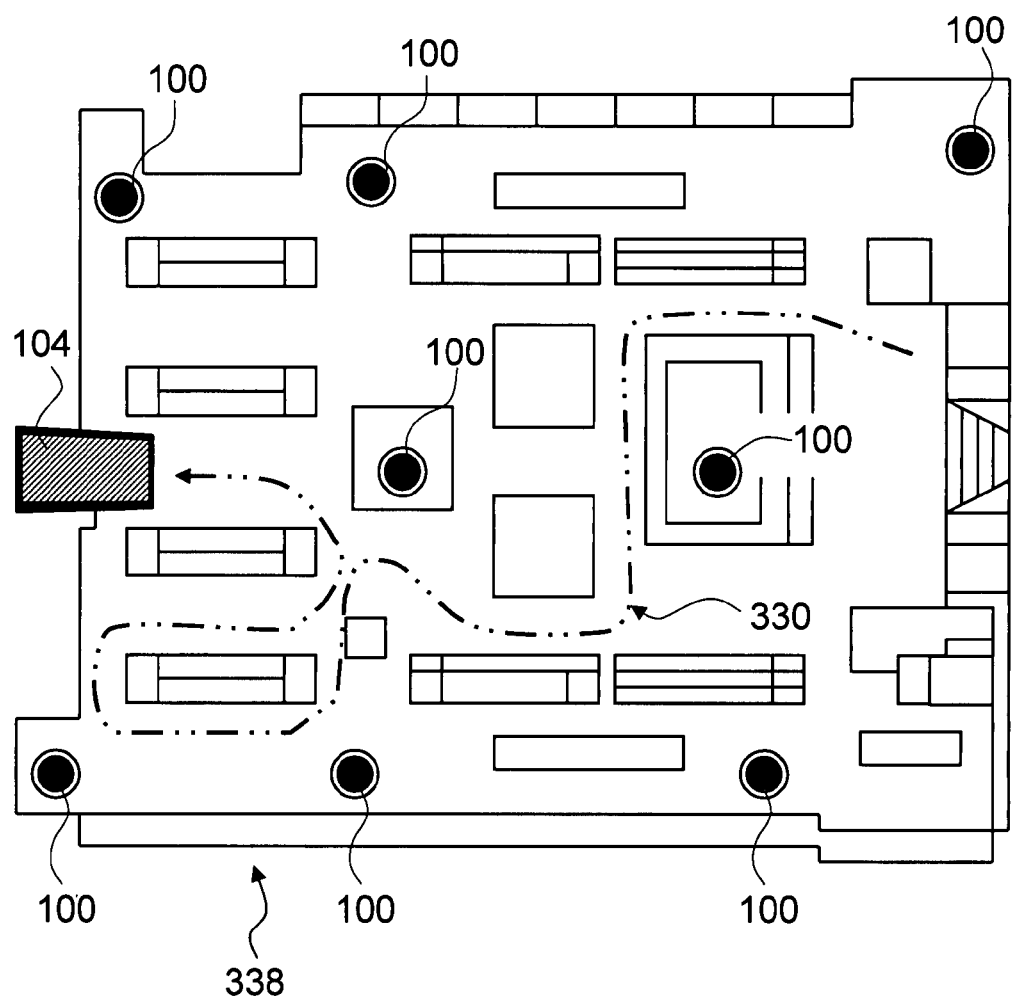
FIG. 3 shows an exemplary path analysis for a specific section of a retail store, where each customer in the store is tracked through arrays of means for capturing images in an exemplary embodiment of the present invention.
Figure 4:
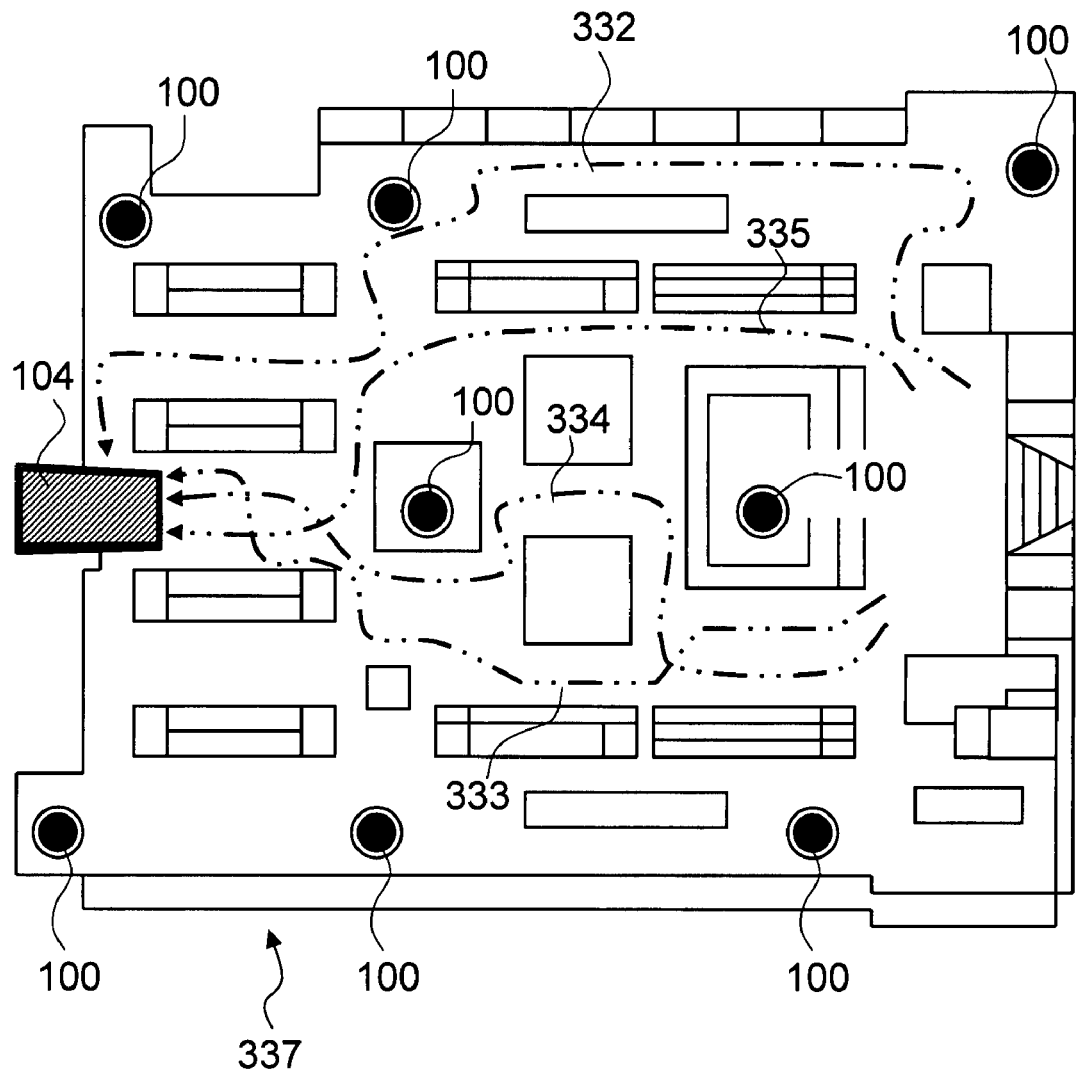
FIG. 4 shows an exemplary path analysis in a retail store, where each customer in the store is tracked and the behavior of the customer or the group of customers can be categorized based on multiple behavioral pattern attributes, through arrays of means for capturing images in an exemplary embodiment of the present invention.

FIG. 3 shows an exemplary "path analysis for a specific section" 338 of a retail store, where each customer 400 in the store is tracked through arrays of means for capturing images 100 in an exemplary embodiment of the present invention. FIG. 4 shows an exemplary path analysis 337 in a retail store, where each customer 400 in the store is tracked and the behavior of the customer 400 or the group of customers 401 can be categorized based on multiple behavioral pattern attributes, through arrays of means for capturing images 100 in an exemplary embodiment of the present invention.

As shown in FIG. 3 and FIG. 4, in the exemplary embodiment of the BBN, the means for displaying output can be installed separately from the means for capturing images 100 or even from the promoted item. This separation of the device locations makes the layout of equipment installation flexible. In addition, the targeted message propagation looks more coincidental than deliberately arranged when the customer 400 arrived at the advertisement display at the end of the path 330.

In the exemplary embodiment as shown in FIG. 3 and FIG. 4, the exemplary embodiment of the BBN can track each customer 400 in a store through arrays of means for capturing images 100. The BBN can also associate the sequence of the path 330 with the customer 400 input and response, whereby the association provides valuable marketing data to the owner of the system.

Figure 5:
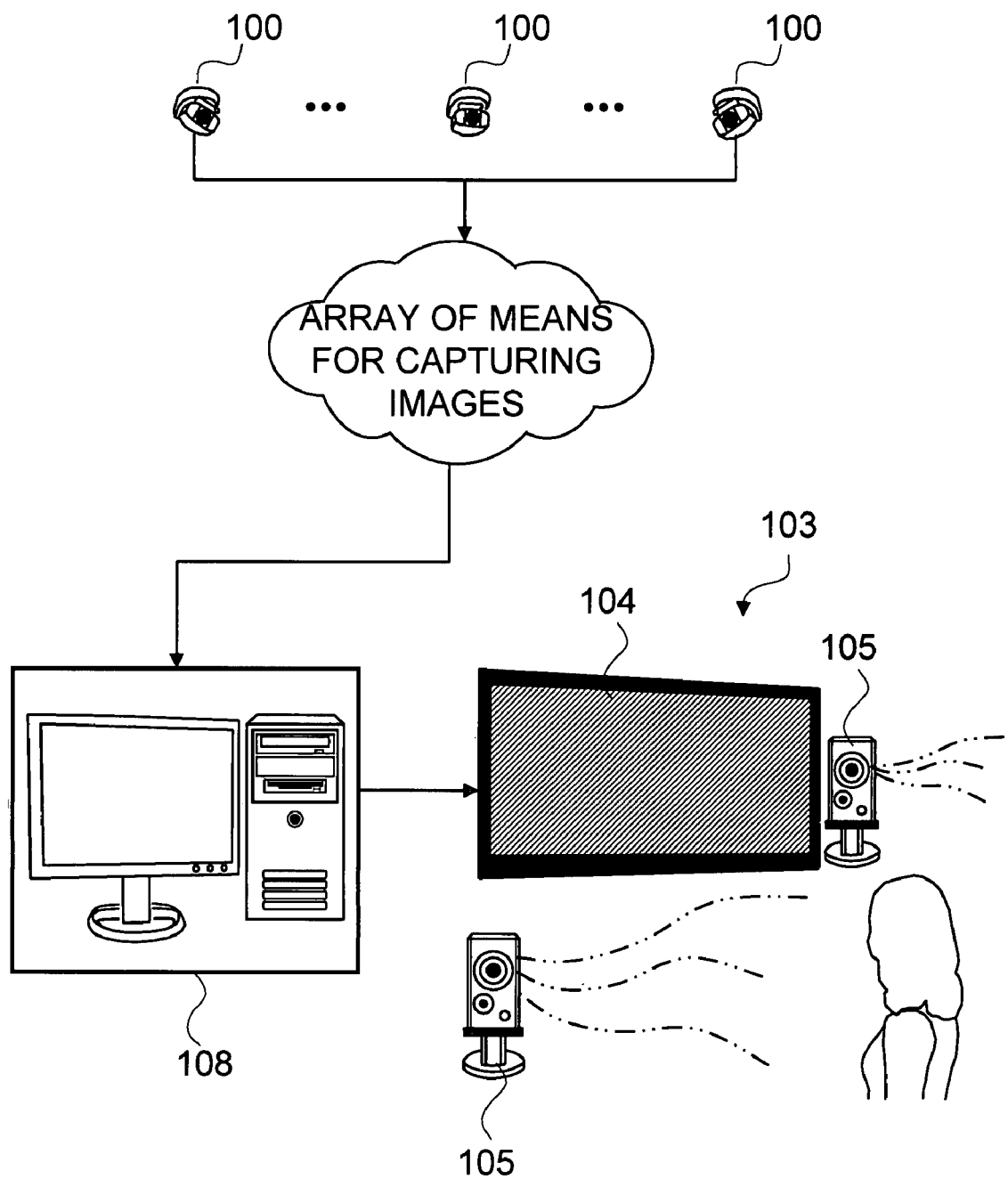
FIG. 5 shows an exemplary hardware configuration in a preferred embodiment of the invention.

FIG. 5 shows an exemplary hardware configuration in a preferred embodiment of the invention. In the exemplary embodiment shown in FIG. 5, the hardware embodiment and the software embodiment can be constructed as follows.

BBN Hardware Embodiment

The exemplary hardware embodiment for a BBN can consist of a plurality of means for capturing images 100 of various focal lengths and CCD sizes. The plurality of means for capturing images 100 can be powered via 18 gauge power cable connected to a standard power supply box, and connected to a means for control and processing 108 via RG59 coaxial cable. The means for control and processing 108 can be an Intel P4 2.4 Ghz PC machine with 512 MB SDRAM memory, with an 80 GB hard disk. An iTuner Spectra framegrabber card can be installed in the PCI slot, and hooked up to the RG59 coaxial cables coming from each of the plurality of means for capturing images 100. The output of the processed information in the means for control and processing 108 can be sent to a means for playing output 103, which can comprise means for displaying output 104 and means for playing audio output 105, such as a speaker system, for narrowcasting.

BBN Software Embodiment

The exemplary BBN software embodiment can consist of three main software packages:

Vision application: The vision application performs all of the low-level vision algorithms on each video stream. The individual track outputs from each video stream are generated by this application on each of the available plurality of means for control and processing 108.

Remote Server: This application resides on each of the remote plurality of means for control and processing 108 that are connected to a plurality of means for capturing images 100 in a retail store. The remote server is responsible for controlling and monitoring the vision application, and communicating with other remote servers and the main server.

Main Server: The main server is responsible for coordinating the actions of all of the remote servers at a particular site. The main server will send the relevant instructions to each of the remote servers, instruct them to begin processing, and receive all of their data. The joining of tracks and the final level of output are produced at the main server.

Figure 6:
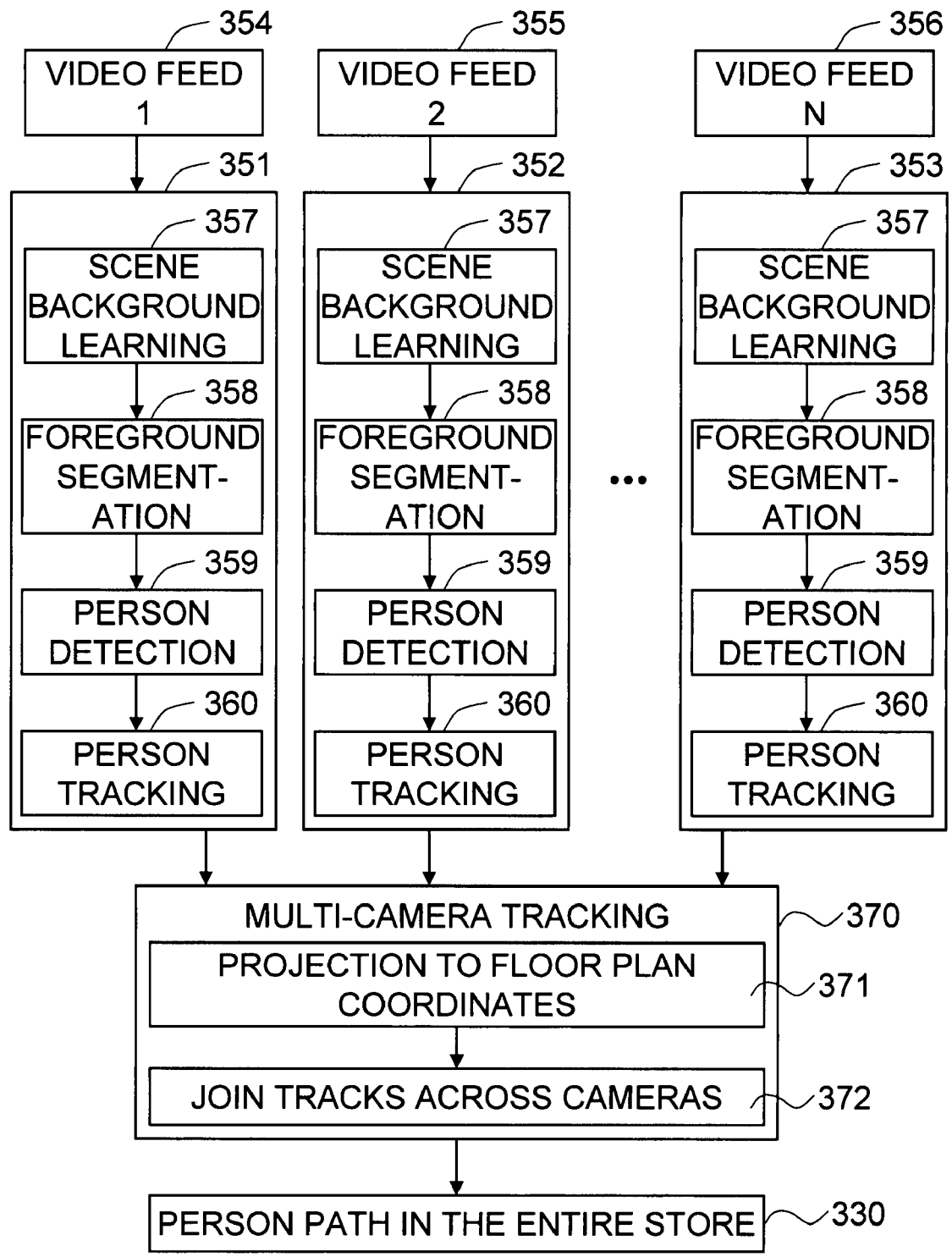
FIG. 6 shows an exemplary process of tracking and behavior analysis for a single customer or a group of customers using multiple means for capturing images in a preferred embodiment of the invention.

FIG. 6 shows an exemplary process of tracking and behavior analysis for a single customer 400 or a group of customers 401 using multiple means for capturing images 100 in a preferred embodiment of the invention.

Person Detection

Person detection in a scene involves temporal segmentation of foreground objects from the scene and then identifying person objects inside the foreground regions, where an intuitive representation of the store itself is considered background and everything else foreground. A plurality of streams of video frames are processed, video feed 1 354, video feed 2 355, and video feed N 356 as shown in FIG. 6. In each single camera person tracking, such as the "single camera person tracking 1" 351, the "single camera person tracking 2" 352, and the "single camera person tracking N" 353, each pixel within the video frame is analyzed based on its temporal motion information. Each pixel is then modeled as a series of Gaussian distributions with a mean and a standard deviation at the scene background learning 357 process. This approach is shown in the following prior art works: W. E. L. Grinson, et al., "Using Adaptive Tracking to Classify and Monitor Activities in a Site," in IEEE Conference on Computer Vision and Pattern Recognition, 1998; W. E. L. Grinson, et al., "Adaptive background mixture model for real-time tracking," in IEEE Conference on Computer Vision and Pattern Recognition, 1999; and N. Friedman, "S.R. Image Segmentation in Video Sequences: A Probabilistic Approach," in Thirteenth Conf. on Uncertainty in Artificial Intelligence, 1997.

Pixel values falling near one of the Gaussian means are statistically likely to be background pixels, while the remaining pixels will be classified as foreground.

After a background model has been created for each pixel through the scene background learning 357, foreground segmentation 358 can be performed on future frames. Further processing is performed on the foreground segmentation 358 images in order to detect 359 and track 360 people. The possibility for erroneous foreground pixels exists due to changes in lighting or the environment. Thus, not every group of foreground pixels may belong to an actual person. To handle this problem, a template based approach is used in the exemplary embodiment of the present invention.

Figure 7:
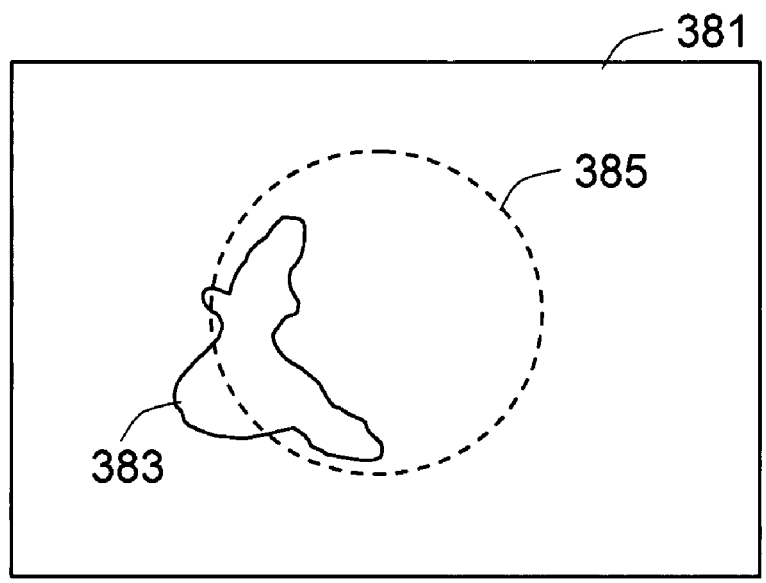
FIG. 7 shows an exemplary match process between a blob of foreground pixels with a template representing the size and shape of a person at a given location in a preferred embodiment of the invention.
Figure 7:
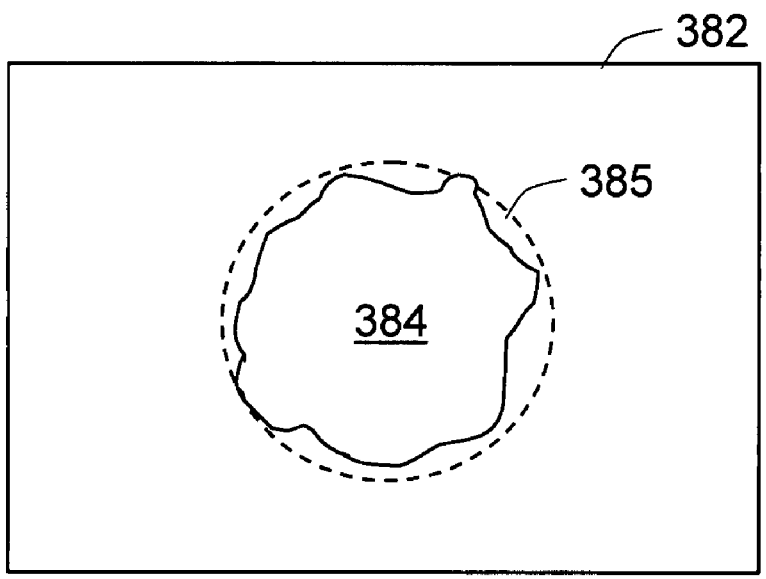

FIG. 7 shows an exemplary match process between a blob of foreground pixels with a template representing the size and shape of a person at a given location in a preferred embodiment of the invention.

In "person template matching 1" 381 shown in FIG. 7, the "foreground segmentation blob 1" 383 (solid black line) does not match the person template 385 (dotted line) at this location. There is a low probability that a person exists at this location. However, in "person template matching 2" 382 shown in FIG. 7, the "foreground segmentation blob 2" 384 very closely matches the person template 385 at this location. Therefore, there is a high probability that a person exists at this location.

Likewise, each "blob" of foreground pixels is matched to a template representing the size and shape of a person at a given location, as illustrated in the exemplary process shown in FIG. 7. By comparing the person templates to areas with segmentation in the image, the probability that a person is standing at a specific location can now be computed. Threshold is then used to filter out low-probability person-matches.

Figure 8:
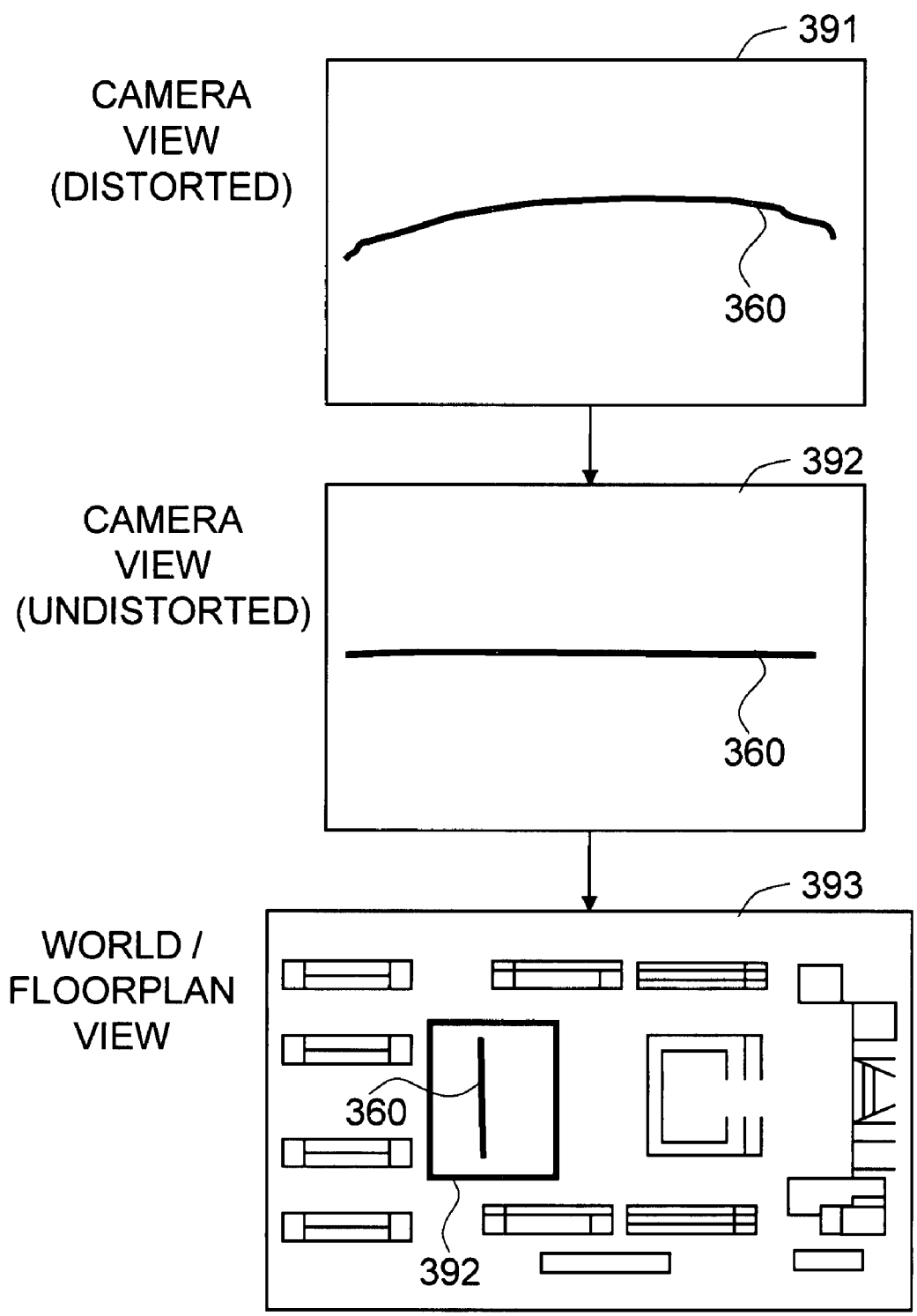
FIG. 8 shows an exemplary process of correcting the tracks to account for camera and lens-specific distortion in a preferred embodiment of the invention.

FIG. 8 shows an exemplary process of correcting the tracks to account for camera and lens-specific distortion in a preferred embodiment of the invention.

Person Tracking Within a Camera View

In the exemplary embodiment, person tracking 360 within a camera view can be performed by the Continuously Adaptive Mean Shift (Camshift) algorithm. Tracks are created in regions where people were previously detected. The color histogram surrounding the track's location is computed, and then used to generate a probability distribution. The peak (mode) of this distribution is then located from frame to frame by an adapted version of the Mean Shift algorithm. The Mean Shift algorithm can be found in the prior art by G. R. Bradski, "Computer video face tracking for use in a perceptual user interface," Intel Technology Journal, Q2, 1998.

Given a probability density image, the exemplary embodiment can find the mean of the distribution by iterating in the direction of maximum increase in probability density. At each frame, the position is recorded and combined with past location information to generate a valid track.

Multi-Camera Tracking

There are 3 key components to the multi-camera tracking system that the exemplary embodiment is concerned with, which are as follows:

1) correct camera-specific distortion, 2) geometric projection of the tracks from local camera coordinates to a world coordinate system, and 3) finding track correspondences between multiple camera views and joining them.

Prior to projecting the tracks onto the floor plan 393, the tracks themselves must be corrected to account for camera/lens-specific distortion. Generally, the image that is being processed suffers from either fish-eye or barrel distortion due to the bending of light as it passes through a camera lens, as illustrated by the person tracking 360 in the camera view (with distorted tracking) 391. This distortion is modeled by a polynomial, using its degree and coefficients as input parameters specific to each camera/lens combination. The polynomial itself defines the transformation of a point x from the distorted coordinate space to a point P(x) that represents how the point would appear if there were no camera distortion. Each track is then undistorted to allow for more accurate geometric projection, as illustrated by the person tracking 360 in the camera view (with undistorted tracking) 392.

Projecting the local camera tracks, a plurality of the person tracking 360 in the camera view (with undistorted tracking) 392 onto the floor plan 393 is performed by deriving a homography matrix based on point correspondences. A series of point correspondences are marked between the local camera view and the world coordinate view, which in this case is the store's floor plan 393. The relationship between the corresponding sets of points in the two images is used to define a homography matrix. This homography matrix can be used to transform points (and ultimately person tracks) from one coordinate system to another.

Correspondences between tracks across a plurality of means for capturing images 100 are found by using the method discussed by F. Porikli, "Multi-Camera Surveillance: Object-Based Summarization Approach," March 2004, MERL. In the exemplary embodiment, Bayesian Belief Networks can be used to establish the correspondences. This method is based on the strong correlation between camera system geometry and the likelihood of the objects appearing in a certain camera view after they exit from another one.

Figure 9:
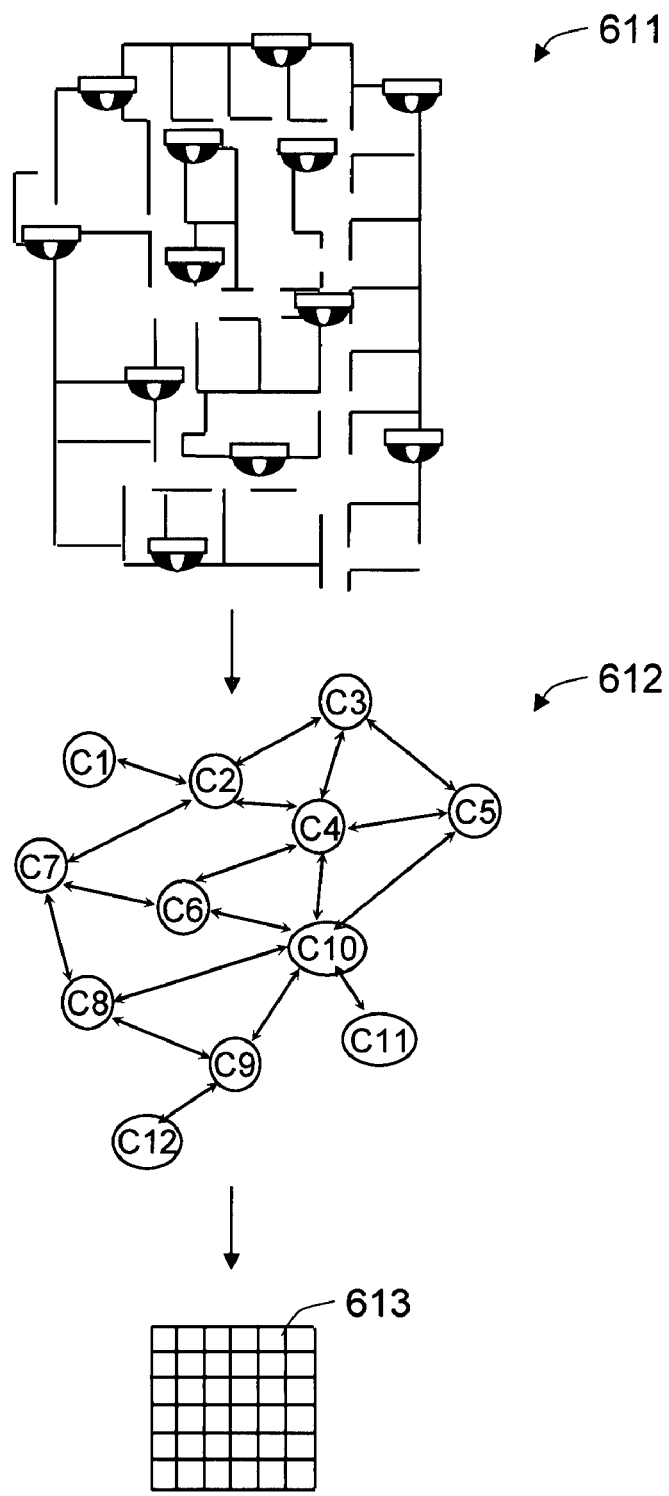
FIG. 9 shows an exemplary network of a plurality of means for capturing images and correspondences between tracks across the plurality of means for capturing images in a preferred embodiment of the invention.

FIG. 9 shows an exemplary "network of a plurality of means for capturing images" 611 and correspondences between tracks across the plurality of means for capturing images 100 in a preferred embodiment of the invention. FIG. 9 also shows the Bayesian Belief Network for the "network of a plurality of means for capturing images" 611. Each means for capturing images 100 corresponds to a node in the directed graph 612. The links show the possible physical routes between the plurality of means for capturing images 100.

As illustrated in FIG. 9, the "network of a plurality of means for capturing images" 611 can be modeled as a Bayesian Belief Network, which is a graphical representation of a join probability distribution over a set of random variables. The Bayesian Belief Network is a directed graph in which each set of random variables is represented by a node, and directed edges between nodes represent conditional dependencies. The dependencies can represent the casual inferences among variables. The transition probabilities, corresponding to the likelihood of a person moving from one camera to another linked camera, are learned by observing the system. Note that each direction on a link may have a different probability. However, the total incoming and outgoing probability values are equal to one. This results in a transition probability "matrix for a plurality of means for capturing images" 613. This method will provide a scalable tracking system with a plurality of means for capturing images 100, such as a multi-camera tracking system, which handles the uncertainty in associating people across a plurality of means for capturing images 100.

Figure 10:
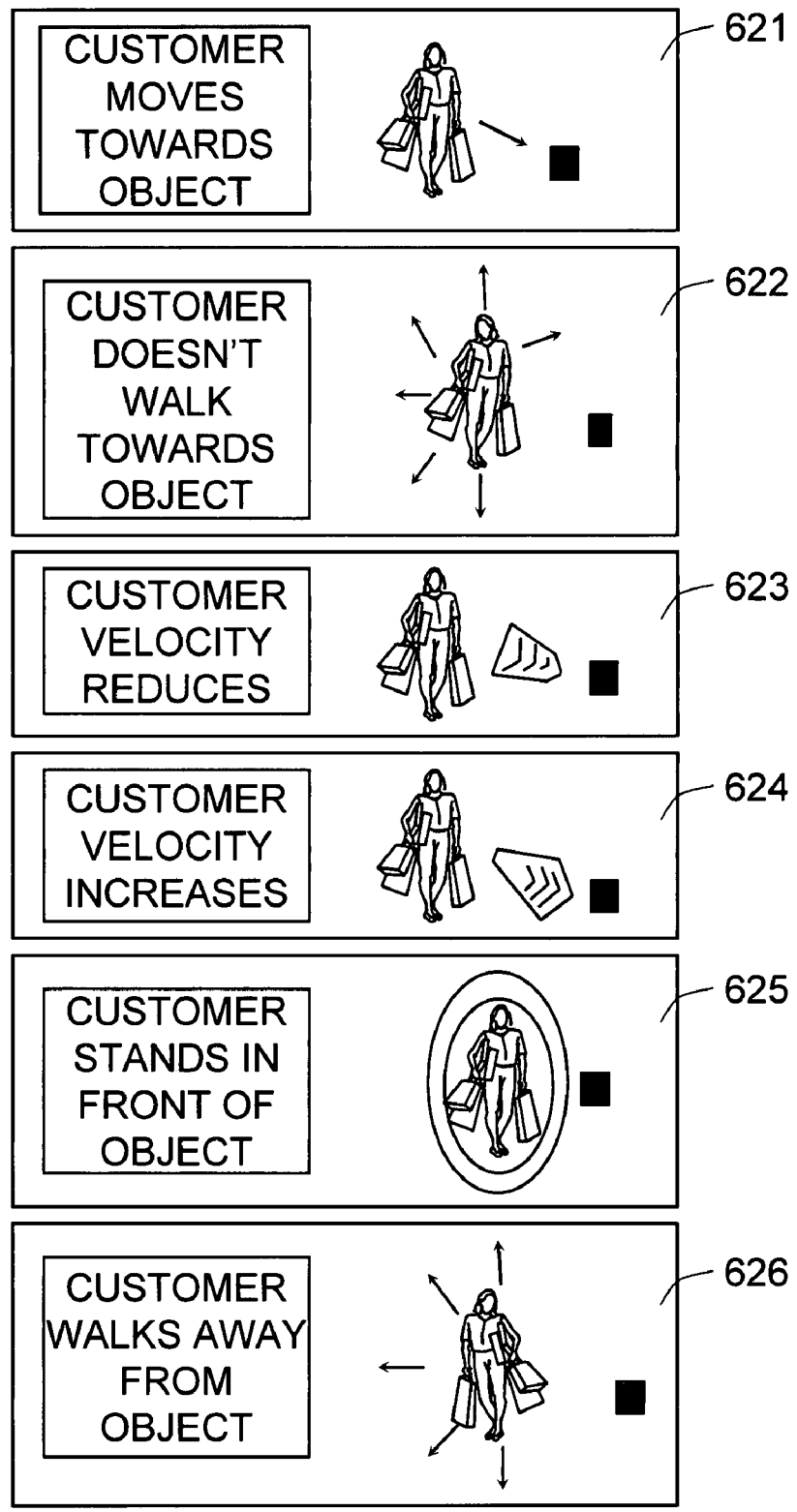
FIG. 10 shows exemplary spatio-temporal primitives for modeling human-object behavior in retail enterprises, where a preferred embodiment of the invention is often installed.

FIG. 10 shows exemplary spatio-temporal primitives for modeling human-object behavior in retail enterprises, where a preferred embodiment of the invention is often installed.

Behavior Recognition

Behavior recognition is achieved via spatio-temporal analysis of tracks using geometry and pattern recognition techniques. This is achieved by defining and detecting spatio-temporal relations specific to the retail enterprise domain followed by a Bayesian Belief propagation approach to modeling primitive behaviors specific to the retail domain. In the exemplary embodiment shown in FIG. 10, the primitive behaviors can comprise categories of "customer moves towards object" 621, "customer doesn't walk towards object" 622, "customer velocity reduces" 623, "customer velocity increases" 624, "customer stands in front of object" 625, and "customer walks away from object" 626. These primitive behaviors can then be combined to model pre-defined complex behaviors. This method is similar to two stage behavior recognition systems where probabilistic inference is performed on high-level semantic notions, using variable length Hidden Markov Models (HMM), Bayes nets and stochastic grammar. Exemplary prior arts for the variable length Hidden Markov Models (HMM) can be found in A. Galata, et al., "Modelling Interaction Using Learnt Qualitative Spatio-Temporal Relations and Variable Length Markov Models," in European Conference on Artificial Intelligence, 2002, Lyon. Exemplary prior arts for the Bayes nets can be found in H. Buxton, et al., "Advanced visual surveillance using bayesian networks," in International Conference on Computer Vision, 1995, Cambridge, Mass., and S. G. Gong, et al., "Bayesian nets for mapping contextual knowledge to computational constraints," in British Machine Vision Conference, 1993, Guildford, England. Exemplary prior arts for the stochastic grammar can be found in Y. Ivanov, et al., "Recognition of Visual Activities and Interactions by Stochastic Parsing," IEEE Trans on Pattern Analysis and Machine Intelligence, 2000. 22(8): p. 852-872, and D. Moore, et al., "Recognizing Multitasked Activities using Stochastic Context-Free Grammar," in Workshop on Models versus Exemplars in Computer Vision held in Conjunction with IEEE CVPR 2001, 2001, Kauai, Hi.

This approach to detecting qualitative spatio-temporal relations for human-object relationships is based on methods developed by 1) A. Cohn, et al., "Towards an Architecture for Cognitive Vision Using Qualitative Spatial-Temporal Representations and Abduction," Spatial Cognition III, 2003; 2) J. Fernyhough, et al., "Event recognition using qualitative reasoning on automatically generated spatio-temporal models from visual input," in IJCAI 97 Workshop on Spatial and Temporal Reasoning, 1997, Nagoya; and 3) J. Fernyhough, et al., "Constructing Qualitative Event Models Automatically from Video Input, Image and Vision Computing," 2000(18): p. 81-103.

Fernyhough, et al. pre-defined the spatial relationships in terms of a set of proximity relationships and relative direction of motion relationships. FIG. 10 shows the exemplary spatio-temporal primitives, which an exemplary embodiment of BBN can use for modeling the relationships between human and object in retail enterprises. These spatio-temporal relations scene descriptors are invariant to the absolute position and direction of the interacting objects within a scene and encode relative spatio-temporal information. Motion history information from the tracking algorithm will be used to extract features and create a feature vector, which contains the relative spatial location and relative velocities with respect to the objects in the scene. These feature vectors will then be used to develop probabilistic models for recognizing the spatio-temporal relationships in a new video sequence. These spatio-temporal relations will then be combined using probabilistic networks to model the desired behavior.

Once models for desired customer behavior exist, customer behavior may then be analyzed. As a customer 400 approaches an ad display, the customer's previous behaviors will be analyzed and this information will be used to influence the ad content selection. For example, a customer 400 that recently spent large amounts of time in the cosmetic section may be shown a cosmetic advertisement containing references to items on specific shelves where they had shopped.

In group situations, the behaviors of the individuals will be analyzed to determine whether those individuals have been traveling as a group within the store or are simply independent individuals arriving on the scene simultaneously. If the determination has been made that the individuals are traveling as a group, then their individual behaviors may be combined into a set of group-specific behaviors (group moves towards object, group velocity increases, etc. . . . ). A decision may then be made to tailor ad content to a group, rather than decide among separate individuals.

Exemplary attributes for analyzing behavioral pattern based on visual information can be achieved from the shopping and walkthrough history of the customer 400 or the group of customers 401, i.e. spatial information where the customer 400 or the group of customers 401 has been in the path 330 through the store, using arrays of sensing devices, such as the means for capturing images 100.

In the present invention, another exemplary attribute of extracting the interest of the customer 400 or the group of customers 401 can be processed by measuring the time spent in a certain area within the store.

In the present invention, the step and means for analyzing the path 330 of the customer 400 or the group of customers 401 can further comprise the following attributes:
 a) temporal pattern,
 b) spatial preference pattern,
 c) frequency pattern,
 d) relational pattern, and
 e) special event pattern.

The exemplary temporal pattern attribute can be time spent in each section of the store or the time of the day. The exemplary spatial preference pattern attribute can be path history or preference in a certain path vs. others. The exemplary frequency pattern attribute can be frequency of visiting certain sections multiple times or more times than other sections. The exemplary relational pattern attribute can be relative effect of one path vs. another, relative effect of a path 330 when there is interior decoration modification or stock-layout change, or relationship between the path 330 and amenities in the store, such as a bathroom, diaper changing room, water fountain, telephone booth, and customer service. The exemplary special event pattern attribute can be change in the path 330 due to the special event of the day.

In the exemplary embodiment, as also shown in the earlier FIG. 4, the BBN can categorize the behavior of the customer 400 or the group of customers 401 based on the exemplary spatial preference pattern attribute based on the history of each path 330. As such, when this categorization is useful according to the market needs of the owner of a particular system, as shown in FIG. 4, different paths are analyzed and categorized in order to show the spatial preference pattern by the customers.

Figure 11:
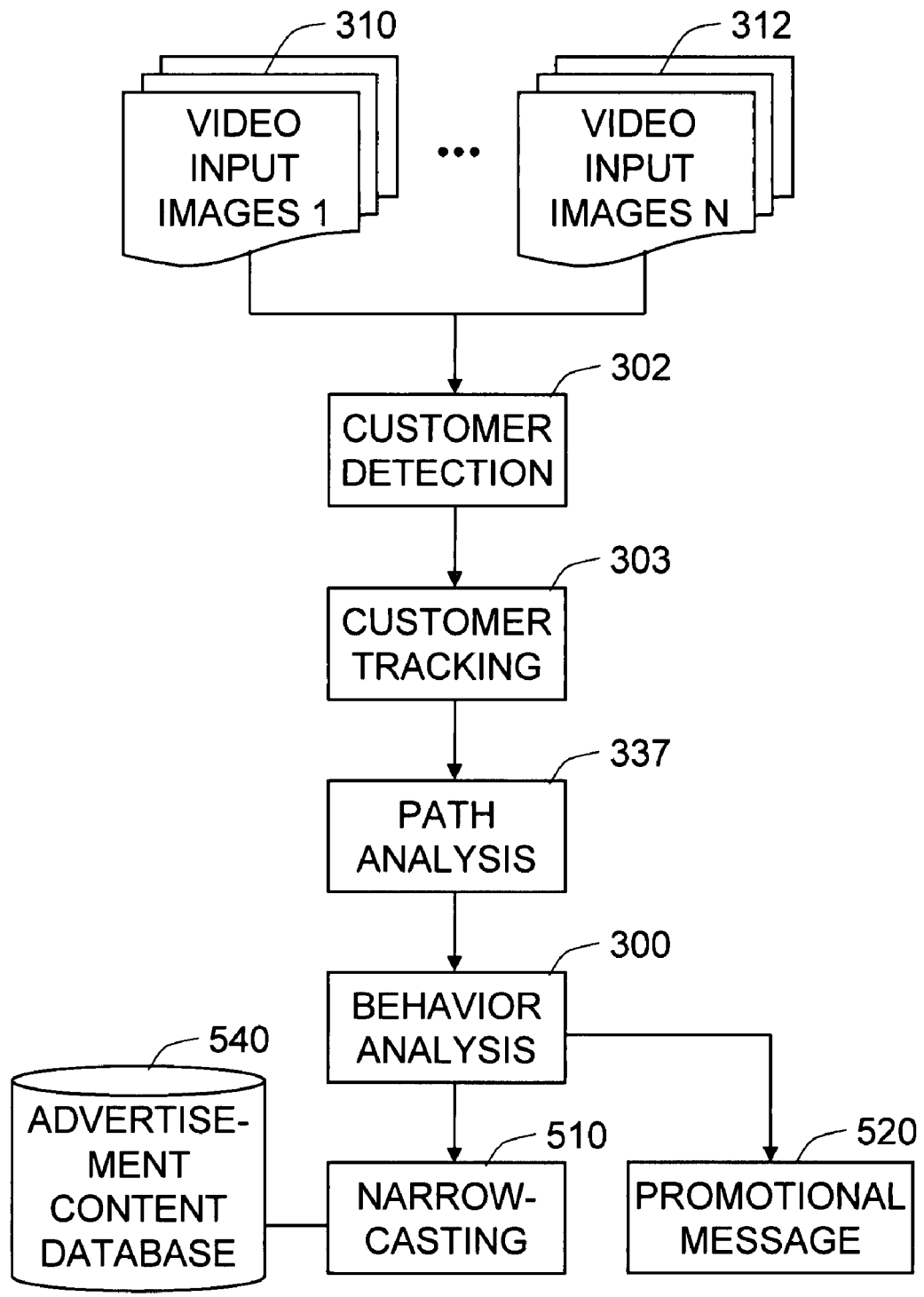
FIG. 11 shows an exemplary process of single customer tracking and behavior analysis in a preferred embodiment of the invention.

FIG. 11 shows an exemplary process of single customer tracking and behavior analysis in a preferred embodiment of the invention using a plurality of means for capturing images 100. In the exemplary embodiment, the BBN detects 302 and tracks 303 the customer 400 in the video input images 320 from a plurality of means for capturing images 100. The BBN joins the trajectories of the customer tracks from a video of a means for capturing images 100 to another video of a means for capturing images 100 while the customer 400 appears and disappears between the field of views among a plurality of means for capturing images 100. Based on the tracking information, the BBN analyzes 337 the path 330 of the particular customer 400 and the path analysis 337 can be used as one of the ways to process the behavior analysis 330 of the customer 400 and obtain useful information about the customer behavior, as described earlier referring to FIG. 6 through FIG. 10. Then, the BBN customizes the advertisement content and narrowcasts 510 the content to the customer 400 through the means for playing output 103. The BBN can also produce promotional message 520 on the means for playing output 103 based on the behavior analysis.

Figure 12:
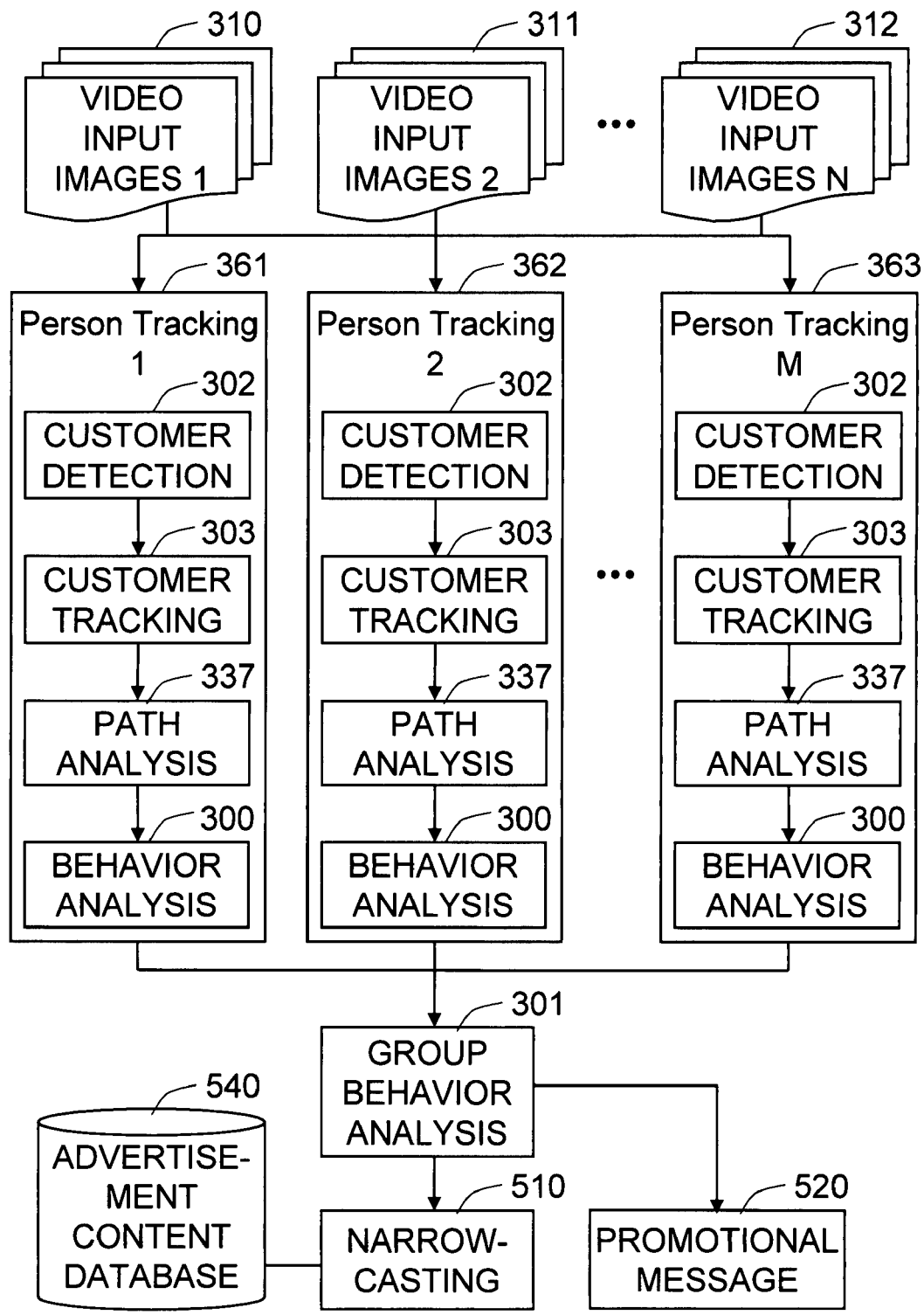
FIG. 12 shows an exemplary process of tracking and behavior analysis for a group of customers in a preferred embodiment of the invention.

FIG. 12 shows an exemplary process of tracking and behavior analysis for a group of customers 401 in a preferred embodiment of the invention with a plurality of means for capturing images 100. In the exemplary embodiment, the BBN repeats the person tracking 360 for each customer 400 that appears in the field of view of a plurality of means for capturing images 100. When the BBN detects a group of customers 401 is approaching the means for playing output 103, the BBN analyzes the group behavior by the aggregated behavior analyses from the individual person tracking 360 information, such as the "person tracking 1" 361, "person tracking 2" 362, and "person tracking M" 363. The group behavior analysis 301 can be decided by a set of pre-defined rules, such as a majority rule, in which the major characteristics among the aggregated individual behavior analyses represent the entire group behavior. Then, the BBN can narrowcast the advertisement content based on the representative behavior characteristics of the group of people.

Figure 13:
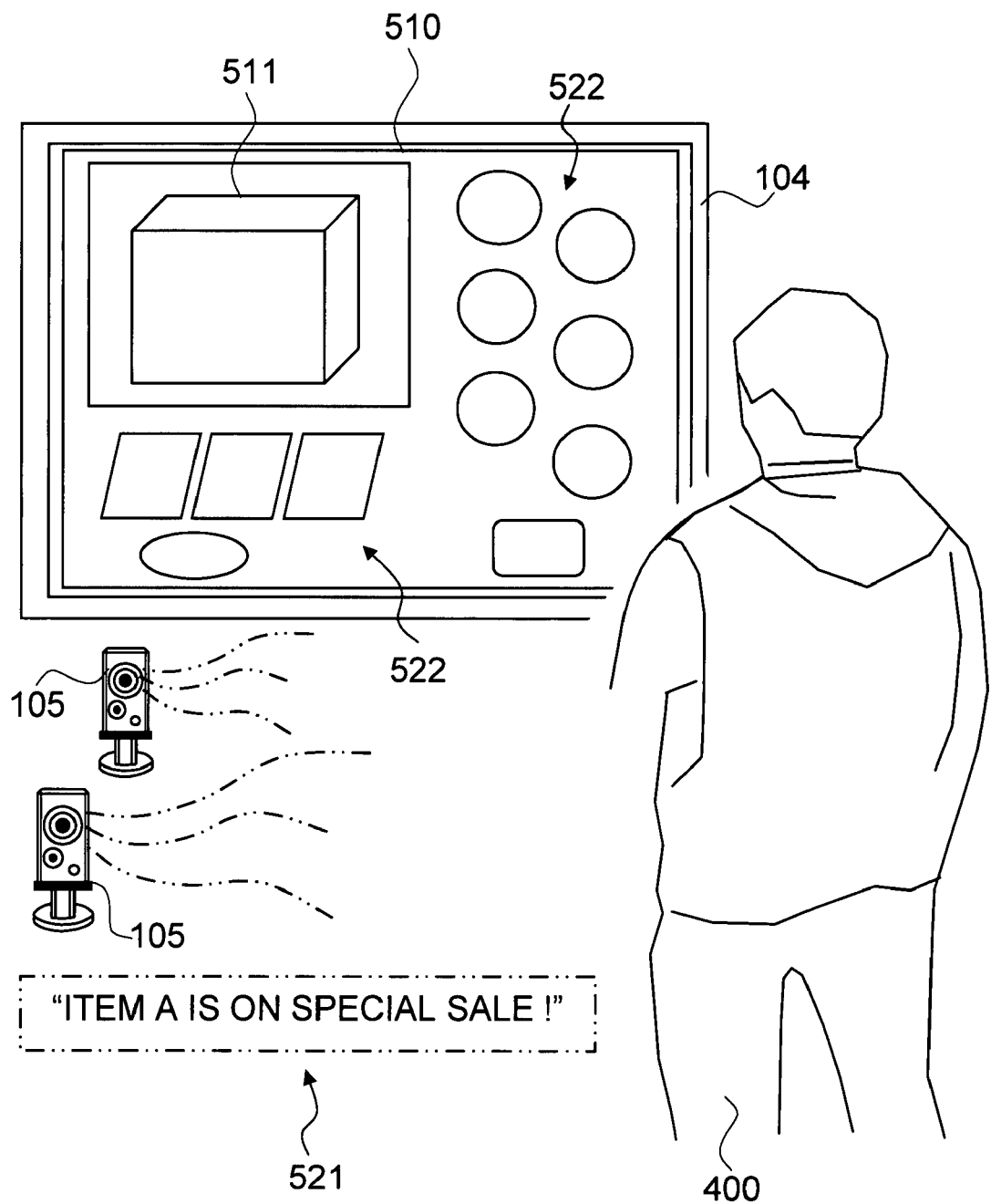
FIG. 13 shows an exemplary application screen of narrowcasting, where the exemplary embodiment of the invention provides narrowcasting advertisement and further targeted promotional messages to the customer within the narrowcasting advertisement in order to encourage the customer to engage in certain transactional activity based on the analysis of the behavioral pattern.

FIG. 13 shows an exemplary application screen of narrowcasting 510, where the exemplary embodiment of the invention provides narrowcasting advertisement and further targeted promotional messages to the customer 400 in addition to the primary narrowcasting advertisement in order to encourage the customer 400 to engage in certain transactional activity based on the analysis of the behavioral pattern.

In the exemplary embodiment shown in FIG. 13, the BBN further comprises the step of providing the promotional messages to the customer 400 within said advertisement display content based on the analysis of the behavioral pattern. The promotional messages can be a promotional audio message 521, a promotional visual message 522, or a promotional textual message 523.

In the exemplary embodiment shown in FIG. 13, the BBN encourages the customer 400 to engage in certain transactional activity by playing a promotional audio message 521, such as "ITEM A IS ON SPECIAL SALE!", and a promotional visual 522 message to the customer 400, based on the analysis of the behavioral pattern.

Figure 14:
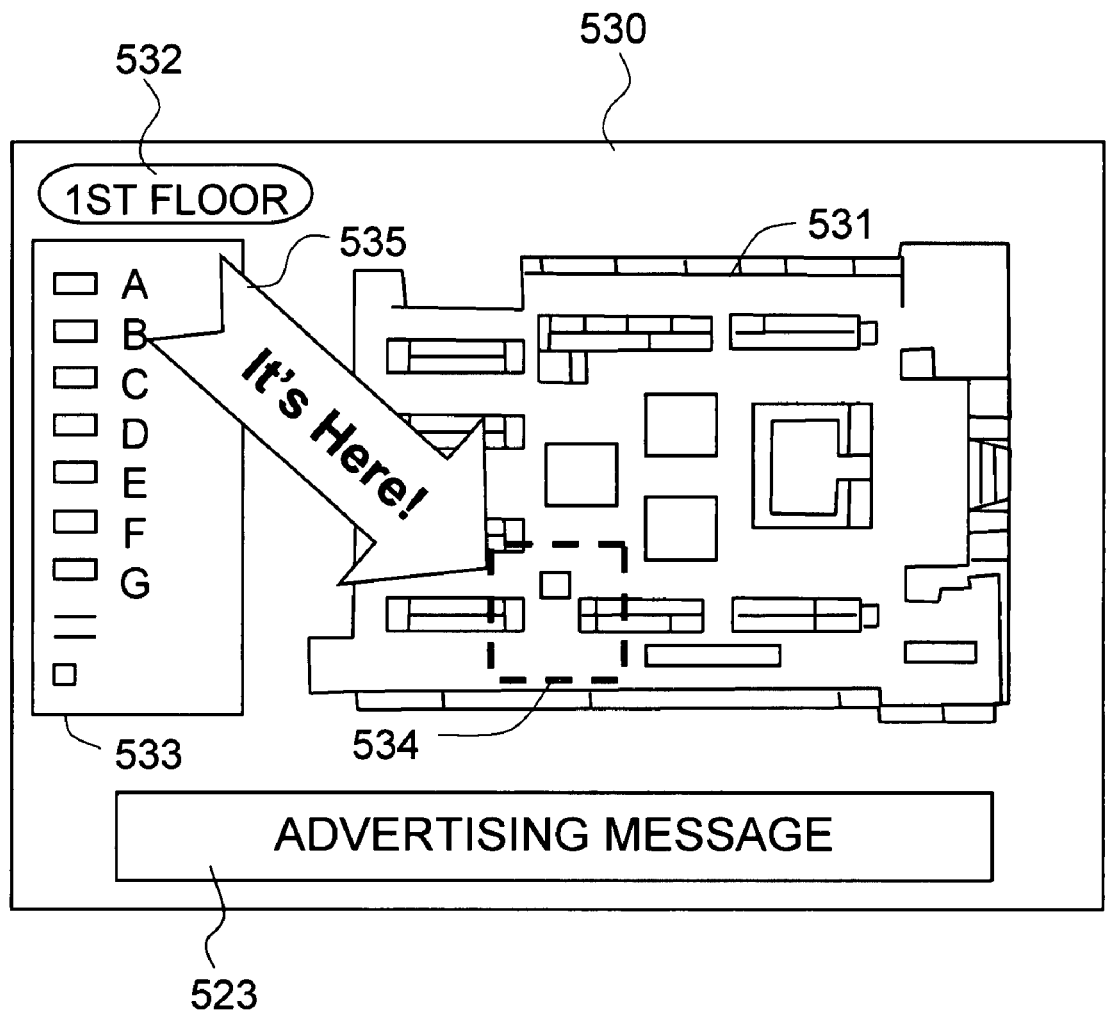
FIG. 14 shows an exemplary map application screen, where the exemplary embodiment of the present invention indicates the specific area of the promoted item by displaying an arrow to the specific area where the promoted item is located in order to help the enticed engagement further.

FIG. 14 shows an exemplary map application screen 530, where the exemplary embodiment of the present invention indicates the specific area 534 of the promoted item in order to help the enticed engagement further. The map application screen 530 indicates the specific area 534 of the promoted item 511 by displaying an arrow 535 to the specific area 534 where the promoted item 511 is located. The map application screen 530 can also have the floor information 532 and legend 533.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:
1. A method of narrowcasting advertisement contents on a means for displaying output based on an automatic and real-time behavior analysis of a customer or a group of customers in a retail store, comprising the following steps of:
 a) capturing a plurality of input video images of the customer or the group of customers in the retail store using a plurality of sensing devices connected in an array of sensing devices to capture video images wherein the array of sensing devices are connected to a first means for control and processing, b) generating individual tracks from the captured plurality of input video images in the first means for control and processing, the tracks representing a shopping and walkthrough history of where the customer or the group of customers have been in the retail store, c) joining the individual tracks from the first means for control and processing in a second means for control and processing, wherein the tracks are joined using a Bayesian Belief Network, d) automatically analyzing, in real-time, behavior pattern of the customer or the group of customers based on visual information from the joined tracks in the second means for control and processing, e) customizing the advertisement contents according to the joined tracks and the behavior pattern from the behavior analysis, and f) narrowcasting the customized advertisement contents on means for displaying output to the customer or the group of customers in the retail store.

2. The method according to claim 1, wherein the method further comprises a step of extracting the interest of the customer or the group of customers by measuring the time spent in a predefined area within the store, wherein the time is calculated based on an analysis of the joined tracks for temporal pattern attribute.

3. The method according to claim 1, wherein the method further comprises a step of analyzing and extracting the behavioral pattern of interest either at an individual customer level or at a group of customers level, by tracking each customer in the retail store through the array of sensing devices, wherein the tracking of each customer is processed based on joined tracks from videos of the plurality of means for capturing images, and wherein the interest at a group of customers level is decided by the majority of the plurality of behavior analysis results after aggregating the tracking for each customer.

4. The method according to claim 1, wherein the method further comprises a step of utilizing a temporal pattern attribute for the behavior analysis, wherein the temporal pattern attribute is calculated based on an analysis of the joined tracks, and wherein the temporal pattern attribute comprises time spent in each section of the store or the time of the day.

5. The method according to claim 1, wherein the method further comprises a step of utilizing a spatial preference pattern attribute for the behavior analysis, wherein the spatial preference pattern attribute is calculated based on an analysis of the joined tracks, and wherein the spatial preference pattern attribute comprises a path history and a preference in a path vs. other paths.

6. The method according to claim 1, wherein the method further comprises a step of utilizing a frequency pattern attribute for the behavior analysis, wherein the frequency pattern attribute is calculated based on an analysis of the joined tracks, and wherein the frequency pattern attribute comprises frequency of visiting certain sections multiple times or more times than other sections.

7. The method according to claim 1, wherein the method further comprises a step of utilizing a relational pattern attribute for the behavior analysis, wherein the relational pattern attribute is calculated based on an analysis of the joined tracks, and wherein the relational pattern attribute comprises relative effect of one path vs. another, relative effect of a path when there is interior decoration modification or floor-layout change, or relationship between the path and amenities in the store, including a bathroom, diaper changing room, water fountain, telephone booth, and customer service.

8. The method according to claim 1, wherein the method further comprises a step of utilizing a special event pattern attribute for the behavior analysis, wherein the special event pattern attribute is calculated based on an analysis of the joined tracks, and wherein the special event pattern attribute comprises change in the path due to the special event of the day.

9. The method according to claim 1, wherein the method further comprises a step of providing promotional messages to the customer in addition to the targeted advertisement contents based on the analysis of the behavioral pattern, whereby the promotional messages further encourage the customer to engage in certain transactional activity.

10. The method according to claim 1, wherein the method further comprises a step of playing the targeted advertisement contents on the means for displaying output installed in a remote location that is separated from the location of the plurality of means for capturing images or products that are promoted by the targeted advertisement, wherein the behavior analysis of the customer, based on the joined tracks, is used for the targeted advertisement delivery, and whereby the targeted advertisement delivery looks more coincidental than deliberately arranged when the customer arrives at the location of the means for displaying output for the targeted advertisement contents along the shopping path.

11. An apparatus of narrowcasting advertisement contents on a means for displaying output based on an automatic and real-time behavior analysis of a customer or a group of customers in a retail store, comprising:

a) means for capturing a plurality of input video images of the customer or the group of customers in the retail store using a plurality of sensing devices connected in an array of sensing devices to capture video images wherein the array of sensing devices are connected to a first means for control and processing, b) the first means for control and processing to generate individual tracks from the captured plurality of input video images, the tracks representing a shopping and walkthrough history of where the customer or the group of customers have been in the retail store, c) second means for control and processing to join the individual tracks from the first means for control and processing, wherein the tracks are joined using a Bayesian Belief Network, and to automatically analyze, in real-time, behavior pattern of the customer or the group of customers based on visual information from the joined tracks in the second means for control and processing, d) means for customizing the advertisement contents according to the joined tracks and the behavior pattern from the behavior analysis, and e) means for narrowcasting the customized advertisement contents on means for displaying output to the customer or the group of customers in the retail store.

12. The apparatus according to claim 11, wherein the apparatus further comprises means for extracting the interest of the customer or the group of customers by measuring the time spent in a predefined area within the store, wherein the time is calculated based on an analysis of the joined tracks for temporal pattern attribute.

13. The apparatus according to claim 11, wherein the apparatus further comprises means for analyzing and extracting the behavioral pattern of interest either at an individual customer level or at a group of customers level, by tracking each customer in the retail store through the array of sensing devices, wherein the tracking of each customer is processed based on joined tracks from videos of the plurality of means for capturing images, and wherein the interest at a group of customers level is decided by the majority of the plurality of behavior analysis results after aggregating the tracking for each customer.

14. The apparatus according to claim 11, wherein the apparatus further comprises means for utilizing a temporal pattern attribute for the behavior analysis, wherein the temporal pattern attribute is calculated based on an analysis of the joined tracks, and wherein the temporal pattern attribute comprises time spent in each section of the store or the time of the day.

15. The apparatus according to claim 11, wherein the apparatus further comprises means for utilizing a spatial preference pattern attribute for the behavior analysis, wherein the spatial preference pattern attribute is calculated based on an analysis of the joined tracks, and wherein the spatial preference pattern attribute comprises a path history and a preference in a path vs. other paths.

16. The apparatus according to claim 11, wherein the apparatus further comprises means for utilizing a frequency pattern attribute for the behavior analysis, wherein the frequency pattern attribute is calculated based on an analysis of the joined tracks, and wherein the frequency pattern attribute comprises frequency of visiting certain sections multiple times or more times than other sections.

17. The apparatus according to claim 11, wherein the apparatus further comprises means for utilizing a relational pattern attribute for the behavior analysis, wherein the relational pattern attribute is calculated based on an analysis of the joined tracks, and wherein the relational pattern attribute comprises relative effect of one path vs. another, relative effect of a path when there is interior decoration modification or floor-layout change, or relationship between the path and amenities in the store, including a bathroom, diaper changing room, water fountain, telephone booth, and customer service.

18. The apparatus according to claim 11, wherein the apparatus further comprises means for utilizing a special event pattern attribute for the behavior analysis, wherein the special event pattern attribute is calculated based on an analysis of the joined tracks, and wherein the special event pattern attribute comprises change in the path due to the special event of the day.

19. The apparatus according to claim 11, wherein the apparatus further comprises means for providing promotional messages to the customer in addition to the targeted advertisement contents based on the analysis of the behavioral pattern, whereby the promotional messages further encourage the customer to engage in certain transactional activity.

20. The apparatus according to claim 11, wherein the apparatus further comprises means for playing the targeted advertisement contents on the means for displaying output installed in a remote location that is separated from the location of the plurality of means for capturing images or products that are promoted by the targeted advertisement, wherein the behavior analysis of the customer, based on the joined tracks, is used for the targeted advertisement, and whereby the targeted advertisement delivery looks more coincidental than deliberately arranged when the customer arrives at the location of the means for displaying output for the targeted advertisement contents along the shopping path.

* * * * *